United States Patent
Gong et al.

(10) Patent No.: US 10,942,771 B2
(45) Date of Patent: Mar. 9, 2021

(54) METHOD, APPARATUS AND SYSTEM FOR MULTI-MODULE SCHEDULING

(71) Applicant: TuSimple, Inc., San Diego, CA (US)

(72) Inventors: Yifan Gong, Beijing (CN); Siyuan Liu, Beijing (CN); Dinghua Li, Beijing (CN); Jiangming Jin, Beijing (CN); Lei Su, Beijing (CN); YiXin Yang, Beijing (CN); Wei Liu, Beijing (CN); Zehua Huang, Beijing (CN)

(73) Assignee: TUSIMPLE, INC., San Diego, CA (US)

( * ) Notice: Subject to any disclaimer, the term of this patent is extended or adjusted under 35 U.S.C. 154(b) by 135 days.

(21) Appl. No.: 16/275,984

(22) Filed: Feb. 14, 2019

(65) Prior Publication Data
US 2019/0317804 A1 Oct. 17, 2019

(30) Foreign Application Priority Data
Dec. 14, 2017 (CN) .......................... 201711341050.6

(51) Int. Cl.
G06F 9/48 (2006.01)
G06F 16/901 (2019.01)
G06F 9/54 (2006.01)

(52) U.S. Cl.
CPC ............ *G06F 9/4881* (2013.01); *G06F 9/547* (2013.01); *G06F 16/9024* (2019.01)

(58) Field of Classification Search
None
See application file for complete search history.

(56) References Cited

U.S. PATENT DOCUMENTS

| 2012/0079490 A1* | 3/2012 | Bond .................... G06F 9/5038 |
| | | 718/103 |
| 2013/0262053 A1 | 10/2013 | Plost |

(Continued)

FOREIGN PATENT DOCUMENTS

| CN | 106605209 A | 4/2017 |
| CN | 109960571 A | 12/2017 |

OTHER PUBLICATIONS

Zhang, Yidi. U.S. Appl. No. 16/557,389 Non-Final Office Action dated Jul. 7, 2020, pp. 1-27.
(Continued)

*Primary Examiner* — Lewis A Bullock, Jr.
*Assistant Examiner* — Melissa A Headly
(74) *Attorney, Agent, or Firm* — Paul Liu; Perkins Coie, LLP

(57) ABSTRACT

The present disclosure provides a method, an apparatus and a system for multi-module scheduling, capable of solving at least one of the problems associated with the multi-module scheduling technique in the related art, i.e., inconsistency in data inputted to a computing module, and a significant delay or low throughput in data transmission between computing modules. The method includes: reading, by a master process, a pre-stored configuration file storing a directed computation graph; initializing, by the master process, states of the nodes and connecting edges in a current computing period; determining a node to be called based on the computation direction of the directed computation graph and the states of the nodes, the node to be called comprising a node having all of its input edges in a complete state; transmitting, to the computing module in the slave process corresponding to the node to be called, a call request of Remote Process Call (RPC) to execute the computing module; updating the state of the node and the state of each output edge of the node upon receiving a response to the call request; and proceeding (Continued)

with a next computing period after determining that the states of all the nodes in the directed computation graph have been updated.

25 Claims, 11 Drawing Sheets

(56) References Cited

U.S. PATENT DOCUMENTS

| | | | |
|---|---|---|---|
| 2016/0188566 A1 | 6/2016 | Jifroodian-Haghighi | |
| 2016/0188789 A1* | 6/2016 | Kisiel | G16B 50/00 703/11 |
| 2017/0180462 A1 | 6/2017 | Leonelli | |
| 2018/0349212 A1* | 12/2018 | Liu | G06F 9/546 |
| 2019/0286486 A1 | 9/2019 | Gong | |

OTHER PUBLICATIONS

Chinese Application No. 201711341050.6, First Office Action dated Oct. 28, 2020. (pp. 1-19).

* cited by examiner

| Slave Process | Called Node | Input Data | Output Data | Updated Connecting Edge After Processing Has Completed | Ready Node |
|---|---|---|---|---|---|
| a | 1 | T1 | T1 | 1-2,1-3,1-1A | 2,1A |
| b | 1' | T1 | T1 | 1'-2',1'-3',1'-1A' | 2',1A' |
| c | 1" | T1 | T1 | 1"-2",1"-3",5,1"-1A" | 2",5,1A" |
| a | 2 | T1 | T11 | 2-3 | 3 |
| b | 1A | T2 | T2 | 1A-2A,1A-3A,1A-1B | 2A,1B |
| c | 2' | T1 | T12 | 2'-3' | 3' |
| d | 1A' | T2 | T2 | 1A'-2A',1A'-3A',1A'-1B' | 2A',1B' |
| e | 2" | T1 | T13 | 2"-3" | 3" |
| f | 5 | T1 | T15 | 5-4"",5-5A | 4"" |
| g | 1A" | T2 | T2 | 1A"-2A",1A"-3A",1A"-1B",1A"-5A | 2A",5A,1B" |
| a | 3 | T1,T11 | T11' | 3-4,3-3A | None |
| b | 2A | T2 | T21 | 2A-3A | 3A |
| c | 1B | T3 | T3 | 1B-2B,1B-3B | 2B |
| d | 3' | T1,T12 | T12' | 3'-4',3'-3A', | 4' |
| e | 2A' | T2 | T22 | 2A'-3A' | 3A' |
| f | 1B' | T3 | T3 | 1B'-2B',1B'-3B' | 2B' |
| g | 3" | T1,T13 | T13' | 3"-4",3"-3A" | 4" |
| h | 4"" | T15 | T15 | 4""-4 | None |
| i | 2A" | T2 | T23 | 2A"-3A" | 3A" |
| j | 5A | T2 | T25 | 5A-4"",5A-5B | 4"" |
| k | 1B" | T3 | T3 | 1B"-2B",1B"-3B",1B"-5B | 2B",5B |

Fig. 11a

| Slave Process | Called Node | Input Data | Output Data | Updated Connecting Edge After Processing Has Completed | Ready Node |
|---|---|---|---|---|---|
| a | 3A | T2,T21 | T21' | 3A-4A, 3A-3B | None |
| b | 2B | T3 | T31 | 2B-3B | 3B |
| c | 4' | T12' | T12' | 4'-4 | None |
| d | 3A' | T2,T22 | T22' | 3A'-4A', 3A'-3B' | 4A' |
| e | 2B' | T3 | T32 | 2B'-3B' | 3B' |
| f | 4" | T13' | T13' | 4"-4 | 4 |
| g | 3A" | T2,T23 | T23' | 3A"-4A", 3A"-3B" | 4A" |
| h | 4A'" | T25 | T25 | 4A'"-4A | None |
| i | 2B" | T3 | T33 | 2B"-3B" | 3B" |
| j | 5B | T3 | T35 | 5B-4B'" | 4B'" |
| b | 3B | T3,T31 | T31' | 3B-4B, 3B-3 | None |
| c | 4A' | T22' | T22' | 4A'-4A | None |
| d | 3B' | T3,T32 | T32' | 3B'-4B', 3B'-3' | 4B' |
| e | 4 | T11',T12',T13',T15' |  | 4-4A | 1,1',1" |
| f | 4A" | T23' | T23' | 4A"-4A | 4A |
| g | 3B" | T3,T33 | T33' | 3B"-4B", 3B"-3" | 4B" |
| h | 4B'" | T35 | T35 | 4B'"-4B | None |
| a | 1 | T4 | T4 | 1-2, 1-3, 1-1A | 2 |
| b | 1' | T4 | T4 | 1'-2', 1'-3', 1'-1A' | 2' |
| c | 1" | T4 | T4 | 1"-2", 1"-3", 1"-5, 1"-1A" | 2",5 |
| d | 4B' | T32' | T32' | 4B'-4B | None |
| e | 4A | T21',T22',T23,T25 |  | 4A-4B | 1A,1A',1A" |
| f | 4B" | T33' | T33' | 4B"-4B | 4B |

Fig. 11b

| Slave Process | Called Node | Input Data | Output Data | Updated Connecting Edge After Processing Has Completed | Ready Node |
|---|---|---|---|---|---|
| a | 2 | T4 | T41 | 2-3 | 3 |
| b | 2' | T4 | T42 | 2'-3' | 3' |
| c | 2" | T4 | T43 | 2"-3" | 3" |
| d | 5 | T4 | T45 | 5-4"",5-5A | 4"" |
| e | 1A | T5 | T5 | 1A-2A,1A-3A,1A-1B | 2A |
| f | 1A' | T5 | T5 | 1A'-2A',1A'-3A',1A'-1B' | 2A' |
| g | 1A" | T5 | T5 | 1A"-2A",1A"-3A",1A"-1B",1A"-5A | 2A",5A |
| h | 4B | T31',T32',T33',T35 |  | 4B-4 | 1B,1B',1B" |

Fig. 11c

METHOD, APPARATUS AND SYSTEM FOR MULTI-MODULE SCHEDULING

CROSS-REFERENCE TO RELATED APPLICATION(S)

This U.S. patent document claims the priority of and the benefits of Chinese Patent Application No. 201711341050.6 of the same title and content that was filed by Applicant Beijing Tusen Weilai Technology Co., Ltd. at the State Intellectual Property Office of China (SIPO) on Dec. 14, 2017.

TECHNICAL FIELD

The present disclosure relates to computer science, and more particularly, to a method, an apparatus and a system for multi-module scheduling.

BACKGROUND

Currently in the field of deep learning, many learning modules are provided in one learning task. In the related art, typically the following scheme is used for multi-module scheduling. Each module is encapsulated as one process and, between modules, required input data is obtained and output data is transmitted by posting and subscribing to messages in accordance with a socket communication mechanism between processes. This scheme is advantageous in that inter-machine communication between processes can be provided, such that processes of respective modules can be distributed across different machines, without the need for modifications to system architecture.

For a deep learning task in the autonomous driving technology as an example, as shown in FIG. 1, the following modules are running on one single machine 1: Camera 1, Vehicle Detection 1, Vehicle Tracking 1, Camera 2, Vehicle Detection 2, Vehicle Tracking 2 and Fusion 1; and the following modules are running on one single machine 2: Camera 3, Vehicle Detection 3, Vehicle Tracking 3 and Segmentation 5. Each of these modules is encapsulated as an individual process. Vehicle Detection 1 obtains a first frame of image, Data P11, outputted from Camera 1, processes Data P11 and outputs Data P11'. Vehicle Tracking 1 obtains Data P11 outputted from the camera 1 and Data P11' outputted from Vehicle Detection 1, and processes Data P11 and Data P11' to obtain Data G11. Also, Vehicle Detection 2 and Vehicle Tracking 2, and Vehicle Detection 3 and Vehicle Tracking 3, perform similar processes and obtain Data G21 and Data G31, respectively. Segmentation 3 obtains Data P31 outputted from Camera 3, and processes Data P31 to obtain Data Q31. Fusion 1 obtains Data G11, Data G21, Data G31 and Data Q31 from Vehicle Tracking 1, Vehicle Tracking 2, Vehicle Tracking 3 and Segmentation 3, respectively, processes the data to obtain a result and outputs the result to a controller. A socket mechanism is used as a communication mechanism between the processes in FIG. 1, in which the required input data and output data of the processes are obtained by posing and subscribing to messages.

However, there are at least two problems in the above multi-module scheduling scheme.

First, there may be inconsistency in data inputted to a computing module. For example, the process Vehicle Tracking 1 in FIG. 1 needs Data P11 outputted from the process Camera 1 and Data P11' outputted from the process Vehicle Detection 1. However, due to delay in information transmission in accordance with the messaging mechanism used in the system, when Vehicle Detection 1 transmits the output Data P11' to the Vehicle Tracking 1, the data received by Vehicle Tracking 1 from Camera 1 is a second frame of image, P12, instead of the first frame of image P11, which may result in computation errors in the process Vehicle Tracking 1. When there are a larger number of modules, this inconsistency problem will be more significant and will lead to more computation errors.

Second, there may be a significant delay in data transmission between computing modules. As each computing module is encapsulated as an individual process and data is transmitted between processes in accordance with a communication mechanism, when a huge amount of image information is communicated between the processes, such communication requires a large number of operations such as serialization, deserialization, compression and decompression, which will greatly increase communication overhead and processing time length. A test has shown that, in one single machine, there is a delay of around 5 milliseconds (ms) for transmitting and receiving one image between processes, and the delay may be up to 40 ms for transmission between processes in two machines. Such a high delay significantly increases the overall delay of the system and greatly degrades the throughput of the system.

SUMMARY

In view of the above problem, the present disclosure provides a method, an apparatus and a system for multi-module scheduling, capable of solving at least one of the problems associated with the multi-module scheduling technique in the related art, i.e., inconsistency in data inputted to a computing module, and a significant delay or low throughput in data transmission between computing modules.

In an aspect of the present disclosure, a method for multi-module scheduling is provided. The method includes: reading, by a master process, a pre-stored configuration file storing a directed computation graph associated with a computing task, the computing task including a plurality of slave processes each including a plurality of computing modules grouped in accordance with a computation direction, the directed computation graph including a plurality of nodes each corresponding to one computing module in one slave process, at least two of the nodes having a connecting edge therebetween, an incoming connecting edge of a node being an input edge and an outgoing connecting edge of a node being an output edge; initializing, by the master process, states of the nodes and connecting edges in a current computing period; determining a node to be called based on the computation direction of the directed computation graph and the states of the nodes, the node to be called including a node having all of its input edges in a complete state; transmitting, to the computing module in the slave process corresponding to the node to be called, a call request of Remote Process Call (RPC) to execute the computing module; updating the state of the node and the state of each output edge of the node upon receiving a response to the call request; and proceeding with a next computing period after determining that the states of all the nodes in the directed computation graph have been updated.

In another aspect of the present disclosure, a method for multi-module scheduling is provided. The method includes: receiving, by a computing module in a slave process in a current computing period, a call request of Remote Process Call (RPC) from a master process, wherein the slave process includes a plurality of computing modules grouped in accordance with a computation direction, and wherein for the computing module having a plurality of pieces of input data, the call request is transmitted by the master process when determining that all of the plurality of pieces of input data to the computing module are ready; performing, by the computing module, processing in response to the call request; and feeding, by the computing module, a response back to the master process when the processing has completed.

In another aspect of the present disclosure, an apparatus for multi-module scheduling is provided. The apparatus includes: a reading module configured to read a pre-stored configuration file storing a directed computation graph associated with a computing task, the computing task including a plurality of slave processes each including a plurality of computing modules grouped in accordance with a computation direction, the directed computation graph including a plurality of nodes each corresponding to one computing module in one slave process, at least two of the nodes having a connecting edge therebetween, an incoming connecting edge of a node being an input edge and an outgoing connecting edge of a node being an output edge; and an executing module configured to initialize states of the nodes and connecting edges in a current computing period; determine a node to be called based on the computation direction of the directed computation graph and the states of the nodes, the node to be called including a node having all of its input edges in a complete state; transmit, to the computing module in the slave process corresponding to the node to be called, a call request of Remote Process Call (RPC) to execute the computing module; update the state of the node and the state of each output edge of the node upon receiving a response to the call request; and proceed with a next computing period after determining that the states of all the nodes in the directed computation graph have been updated.

In another aspect of the present disclosure, an apparatus for multi-module scheduling is provided. The apparatus is applied in a slave process including a plurality of apparatuses for multi-module scheduling grouped in accordance with a computation direction. The apparatus includes: a receiving module configured to receive, in a current computing period, a call request of Remote Process Call (RPC) from a master process, wherein for the apparatus for multi-module scheduling having a plurality of pieces of input data, the call request is transmitted by the master process when determining that all of the plurality of pieces of input data to the apparatus for multi-module scheduling are ready; an executing module configured to perform processing in response to the call request; and a feedback module configured to feed a response back to the master process when the processing by the executing module has completed.

In another aspect of the present disclosure, an apparatus for multi-module scheduling is provided. The apparatus includes a processor and at least one memory storing at least one machine executable instruction. The processor is operative to execute the at least one machine executable instruction to: read a pre-stored configuration file storing a directed computation graph associated with a computing task, the computing task including a plurality of slave processes each including a plurality of computing modules grouped in accordance with a computation direction, the directed computation graph including a plurality of nodes each corresponding to one computing module in one slave process, at least two of the nodes having a connecting edge therebetween, an incoming connecting edge of a node being an input edge and an outgoing connecting edge of a node being an output edge; initialize, by a master process, states of the nodes and connecting edges in a current computing period; determine a node to be called based on the computation direction of the directed computation graph and the states of the nodes, the node to be called including a node having all of its input edges in a complete state; transmit, to the computing module in the slave process corresponding to the node to be called, a call request of Remote Process Call (RPC) to execute the computing module; update the state of the node and the state of each output edge of the node upon receiving a response to the call request; and proceed with a next computing period after determining that the states of all the nodes in the directed computation graph have been updated.

In another aspect of the present disclosure, an apparatus for multi-module scheduling is provided. The apparatus includes a processor and at least one memory storing at least one machine executable instruction. The processor is operative to execute the at least one machine executable instruction to: receive, in a current computing period, a call request of Remote Process Call (RPC) from a master process, wherein for the apparatus for multi-module scheduling having a plurality of pieces of input data, the call request is transmitted by the master process when determining that all of the plurality of pieces of input data to the apparatus for multi-module scheduling are ready; perform processing in response to the call request; and feed a response back to the master process when the processing has completed.

In another aspect of the present disclosure, a system for multi-module scheduling is provided. The system includes a master process and a plurality of slave processes each including a plurality of computing modules grouped in accordance with a computation direction. The master process is configured to read a pre-stored configuration file storing a directed computation graph associated with a computing task, the computing task including a plurality of slave processes each including a plurality of computing modules grouped in accordance with a computation direction, the directed computation graph including a plurality of nodes each corresponding to one computing module in one slave process, at least two of the nodes having a connecting edge therebetween, an incoming connecting edge of a node being an input edge and an outgoing connecting edge of a node being an output edge; initialize states of the nodes and connecting edges in a current computing period; determine a node to be called based on the computation direction of the directed computation graph and the states of the nodes, the node to be called including a node having all of its input edges in a complete state; transmit, to the computing module in the slave process corresponding to the node to be called, a call request of Remote Process Call (RPC) to execute the computing module; update the state of the node and the state of each output edge of the node upon receiving a response to the call request; and proceed with a next computing period after determining that the states of all the nodes in the directed computation graph have been updated. One computing module in the slave process is configured to receive the call request of RPC from the master process, perform processing in response to the call request; and feed a response back to the master process when the processing has completed.

With the solutions according to the embodiments of the present disclosure, a master process controls computation logics of all computing modules in a slave process in accordance with a directed computation graph. That is, the master process controls execution of the computing modules by means of RPC, and maintains states of nodes corresponding to the modules and states of outputs of the nodes based on executions of the modules. A computing module corresponding to a node may be called and executed only when the states of all input edges of the node are complete, and the state of the node and the state of each output edge of the node are updated when a response is received. That is, a computing module will be called and executed only when all pieces of input data in one computing period are complete, such that the consistency in the input data to the computing module may be guaranteed.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. In the figures:

FIGS. 11a-11c show processing flow tables of the system shown in FIG. 9b.

DETAILED DESCRIPTION OF THE EMBODIMENTS

Figure 1:
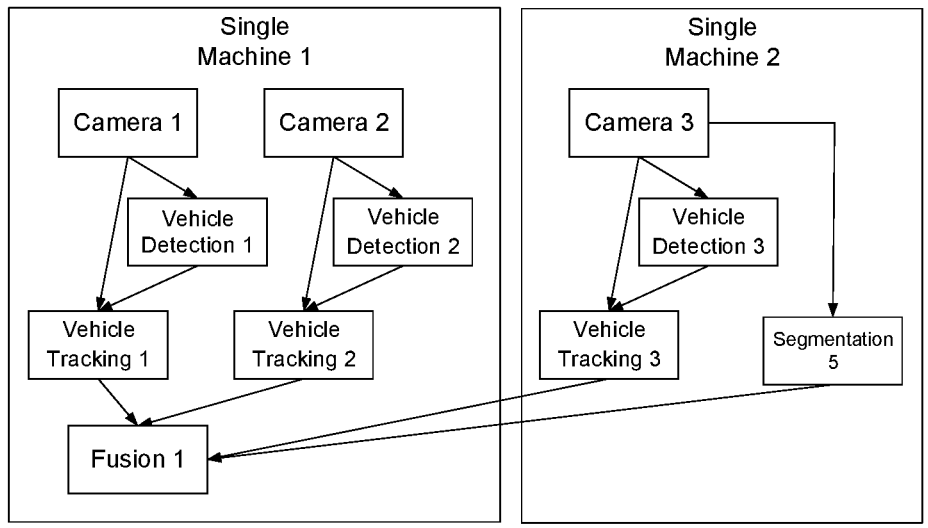
FIG. 1 is a schematic diagram showing an architecture of a learning task including multiple modules in the related art.

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

In view of the problems associated with the multi-module scheduling solution in the related art, i.e., inconsistency in data inputted to a computing module, and a significant delay or low throughput in communication between computing modules, the present disclosure provides a solution for multi-module scheduling, capable of solving at least one of the above problems.

In a solution according to the present disclosure, a master process and a plurality of slave processes are provided. Each slave process includes a plurality of computing modules grouped in accordance with a computation direction. The master process has a directed computation graph pre-stored therein. The directed computation graph includes a plurality of nodes each corresponding to one computing module in one slave process. At least two of the nodes have a connecting edge therebetween. An incoming connecting edge of a node is an input edge and an outgoing connecting edge of a node is an output edge. The master process controls computation logics of all the computing modules in the slave process in accordance with the directed computation graph. That is, the master process controls execution of the computing modules by means of RPC, and maintains states of the nodes corresponding to the modules and states of outputs of the nodes based on executions of the modules. A computing module corresponding to a node can be called and executed only when the states of all input edges of the node are complete, and the state of the node and the state of each output edge of the node are updated when a response is received. That is, a computing module will be called and executed only when all pieces of input data in one computing period are complete, such that the consistency in the input data to the computing module can be guaranteed.

Further, the master process stores directed computation graphs in free storage spaces in a control queue. Between two directed computation graphs, an output edge from a node corresponding to a serial module in a previous directed computation graph adjacent to a directed computation graph to the same node in the directed computation graph is created, such that when the serial module is to be scheduled, its execution needs to be scheduled based on the execution of the serial module in the previous directed computation graph. However, parallel modules are not subject to such constraint and can thus be executed in parallel, so as to improve processing speed.

Furthermore, each slave process includes a plurality of computing modules grouped in accordance with a computation direction. Each slave process has a corresponding shared storage space including a storage space for each computing module in the process. Instead of transmitting data between the computing modules in accordance with the communication mechanism between processes, data is read and written using the storage space shared within the process, so as to achieve improved communication efficiency between the computing modules, reduced communication delay, improved overall communication efficiency among multiple modules and increased system throughput.

In the following, the solutions according to the present disclosure will be described in detail with reference to the figures.

Figure 2:
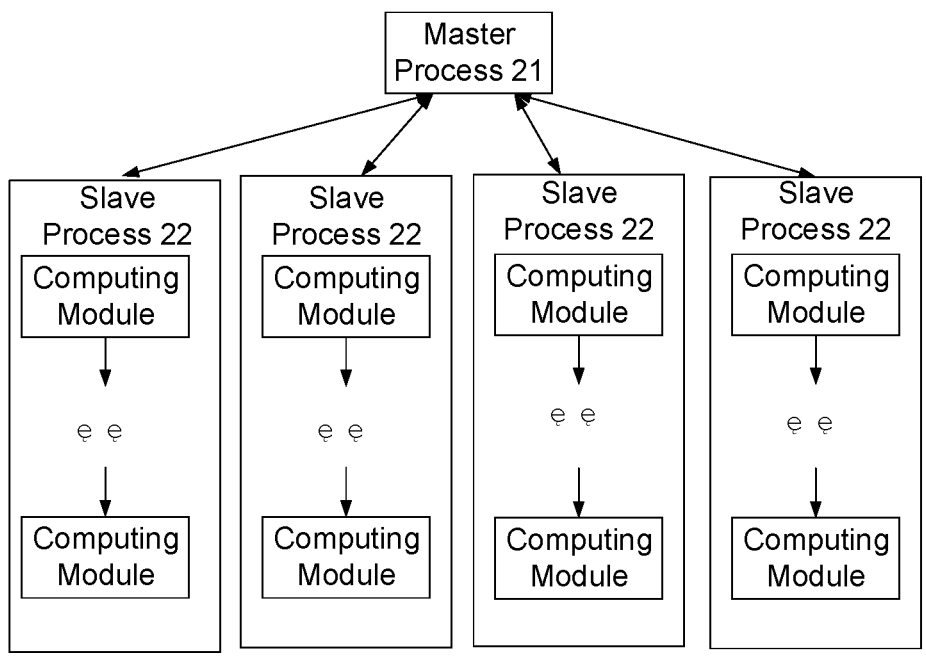
FIG. 2 is a schematic diagram showing a structure of a system for multi-module scheduling according to an embodiment of the present disclosure.

FIG. 2 is a schematic diagram showing a structure of a system for multi-module scheduling according to an embodiment of the present disclosure. The system includes a master process 21 and a plurality of slave processes 22. The master process 21 and the slave processes 22 can be configured in one terminal or over a plurality of terminals. The plurality of slave processes 22 can be configured separately or in a centralized manner. Each slave process includes a plurality of computing modules grouped in accordance with a computation direction.

The master process 21 is configured to control computing logics of each slave process 22. That is, the master process 21 is configured to call the respective computing modules in each slave process for execution, and maintain and update states of the respective computing modules in each slave process 22. Each computing module in each slave process 22 performs processing in response to the call by the master process.

In particular, the master process is configured to read a pre-stored configuration file storing a directed computation graph associated with a computing task. The computing task includes a plurality of slave processes 22 each including a plurality of computing modules grouped in accordance with a computation direction. The directed computation graph includes a plurality of nodes each corresponding to one computing module in one slave process. At least two of the nodes have a connecting edge therebetween. An incoming connecting edge of a node is an input edge and an outgoing connecting edge of a node is an output edge. The master process initializes states of the nodes and connecting edges in the directed computation graph in a current computing period. A node to be called is determined based on the computation direction of the directed computation graph and the states of the nodes. The node to be called includes a node having all of its input edges in a complete state. A call request of Remote Process Call (RPC) is transmitted to the computing module in the slave process 22 corresponding to the node to be called to execute the computing module. The state of the node and the state of each output edge of the node are updated upon receiving a response to the call request. The master process proceeds with a next computing period after determining that the states of all the nodes in the directed computation graph have been updated.

A computing module in the slave process 22 receives the call request of RPC from the master process. The computing module performs processing in response to the call request. The computing module feeds a response back to the master process when the processing has completed.

In the following, the operation principles of the master process 21 and the slave processes 22 will be explained.

Figure 3A:
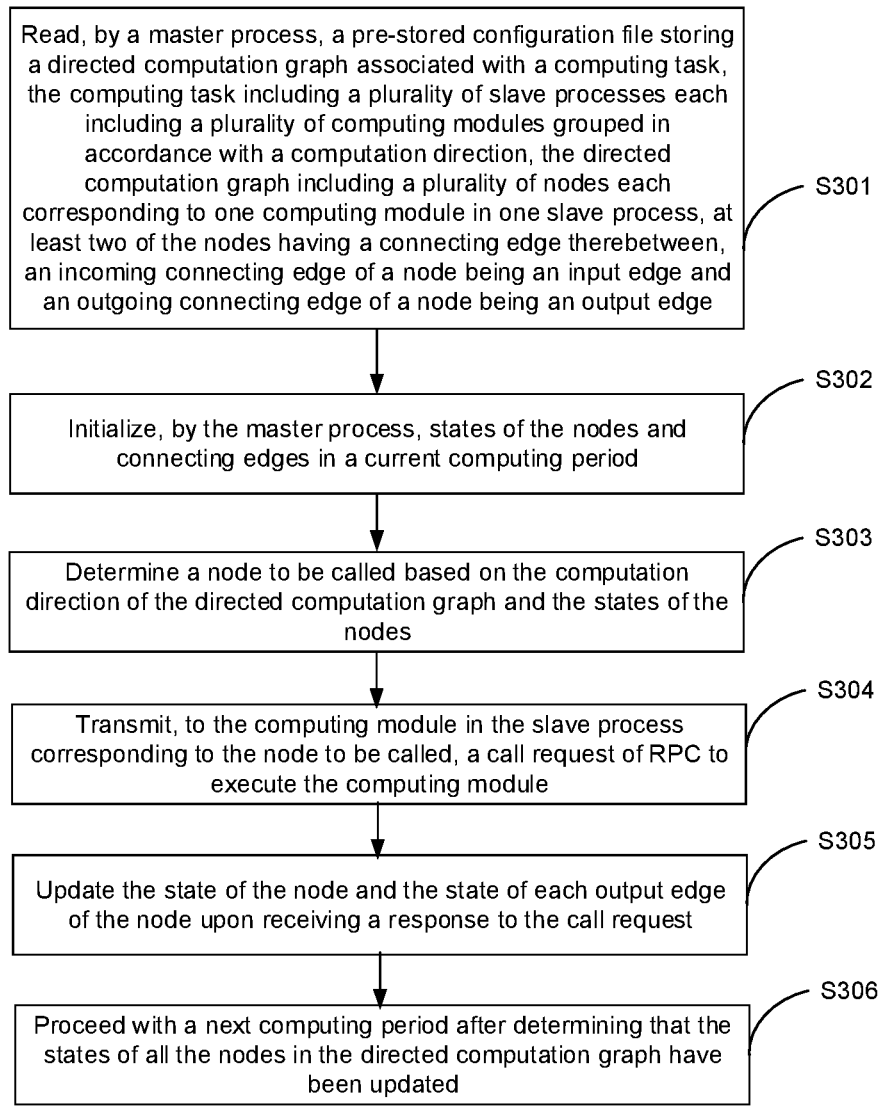
FIG. 3a is a flowchart illustrating a method for multi-module scheduling according to an embodiment of the present disclosure.

FIG. 3a is a flowchart illustrating a method for multi-module scheduling according to an embodiment of the present disclosure. The method can be applied in the master process 21 shown in FIG. 2. As shown in FIG. 3a, the method includes the following processing flow.

Figure 3B:
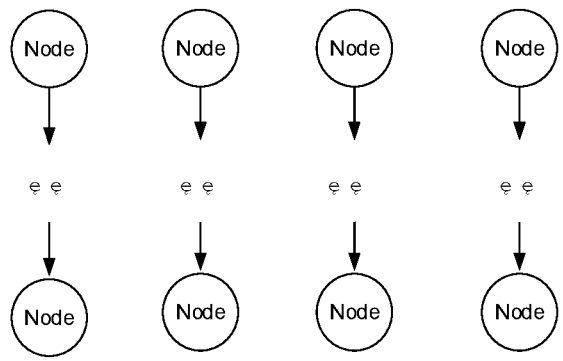
FIG. 3b is a directed computation graph corresponding to a slave process in FIG. 2.

At step 301, the master process reads a pre-stored configuration file storing a directed computation graph associated with a computing task. The computing task includes a plurality of slave processes each including a plurality of computing modules grouped in accordance with a computation direction. FIG. 3b shows an exemplary directed computation graph corresponding to FIG. 2. As shown in FIG. 3b, the directed computation graph includes a plurality of nodes each corresponding to one computing module in one slave process. At least two of the nodes have a connecting edge therebetween. An incoming connecting edge of a node is an input edge and an outgoing connecting edge of a node is an output edge.

Here, the master process can include a master thread and a thread pool including a plurality of slave threads.

At step 302, the master process initializes states of the nodes and connecting edges.

In an embodiment, the computing modules in each slave process can include parallel computing modules and serial computing modules. The master process initializing the states of the nodes and connecting edges can include the following steps.

At step 3021, the master thread determines whether there is any free storage space in a control queue based on a predetermined time interval, and if so, i.e., if the control queue can store at least one additional directed computation graph, proceeds with step 3022, or otherwise, i.e., if the control queue is full, enters a wait state.

At step 3022, one directed computation graph is stored in one free storage space in the control queue.

The control queue can be a First In First Out (FIFO) queue. When the master thread in the master process stores directed computation graphs in the free storage spaces in the control queue, it stores the directed computation graphs sequentially from the tail of the control queue. Later, when the directed computation graphs are released, they are released sequentially from the head of the queue.

At step 3023, it is determined whether more than one directed computation graph is stored in the control queue. If so, the processing proceeds with step 3024; otherwise, i.e., if only one directed computation graph is stored in the control queue, the processing proceeds with step 3025.

At step 3024, when more than one directed computation graph is stored in the control queue, an output edge from a node corresponding to each serial computing module in the directed computation graph in the (i−1)-th storage space to the same node in the directed computation graph in the i-th storage space is created in accordance with a direction of the queue, where $2 \leq i \leq n$ and n is a number of storage spaces in the control queue and is a natural number.

That is, the master thread creates a connecting edge between the nodes corresponding to each serial module in two adjacent directed computation graphs. For example, after a second directed computation graph is stored in the control queue, a connecting edge, which is an output edge, can be created between a node corresponding to a serial computing module in a first directed computation graph and a node corresponding to the same serial computing node in the second directed computation graph. In this way, after a third directed computation graph is stored in the control queue, an output edge can be created between a node corresponding to a serial computing module in the second directed computation graph and a node corresponding to the same serial computing node in the third directed computation graph. Connecting edges are created between the nodes corresponding to the respective serial computing nodes in the directed computation graphs, while there are no such connecting edges between parallel computing modules. In this way, the parallel modules can perform parallel processing while the serial modules can perform serial processing, such that no mistakes in the execution order of the serial modules will occur.

At step 3025, the master thread initializes the states of the nodes and connecting edges in the directed computation graph that is newly stored in the control queue.

Here, the state of each node can include unready, ready, run or done. The state of each connecting edge can include uncomplete or complete.

In an embodiment, the master thread can determine whether the directed computation graph that is newly stored is the first directed computation graph in the control queue. If so, a starting node of the directed computation graph is set to ready, the states of all the other nodes in the directed computation graph are set to unready, and all the connecting edges in the directed computation graph are set to uncomplete. Otherwise, for a connecting edge from a node in a previous directed computation graph adjacent to the directed computation graph to the same node in the directed computation graph, the state of the connecting edge is set to complete when the state of the node in the previous directed computation graph is done, or otherwise the state of the connecting edge is set to uncomplete; each node in the directed computation graph having all its input edges in the complete state is set to ready and the states of all the other nodes are set to unready; and all the connecting edges in the directed computation graph are set to uncomplete.

For example, for the first directed computation graph stored in the control queue, the master thread can set a starting node of the first directed computation graph to ready and the states of all the other nodes in the first directed computation graph to unready, and set all the connecting edges in the first directed computation graph to uncomplete. For a subsequently stored directed computation graph, for a connecting edge (i.e., output edge) from a previous directed computation graph to the directed computation graph, the state of the connecting edge is set to complete when the state of the corresponding node in the previous directed computation graph is done, or otherwise the state of the connecting edge is set to uncomplete; each node in the directed computation graph having all its input edges in the complete state is set to ready and the states of all the other nodes are set to unready; and all the connecting edges in the directed computation graph are set to uncomplete.

At step 303, a node to be called is determined based on the computation direction of the directed computation graph and the states of the nodes. The node to be called includes a node having all of its input edges in a complete state.

In an embodiment, initially in computation, after initializing the states of the nodes and connecting edges in the directed computation graph that is newly stored in the control queue, the master thread can traverse the states of the respective nodes in each directed computation graph in the control queue in accordance with the computation direction, determine each node in the ready state as a node to be called, modify the state of each node to be called into run, push each node to be called into a computing queue and enter the wait state.

Alternatively, in an embodiment, in computation, one slave thread in the thread pool can traverse the states of the respective nodes in each directed computation graph in the control queue in accordance with the computation direction, determine each node in the ready state as a node to be called, modify the state of each node to be called into run, and push each node to be called into a computing queue.

That is, a node is a node to be called only when all of its input edges are in the complete state. In this way, it can be guaranteed that, when a computing module corresponding to a node is called, the plurality of pieces of input data to the computing module are input data in one single computing period, such that the consistency in the data inputted to the computing module can be guaranteed in multi-module scheduling.

At step 304, a call request of RPC is transmitted to the computing module in the slave process corresponding to the node to be called to execute the computing module.

In an embodiment, one slave thread in the thread pool can take one node from the computing queue and transmit the call request of RPC to the computing module in the slave process corresponding to the one node.

Further, in another embodiment, one slave thread in the thread pool can determine an identifier of the computing module corresponding to the one node taken from the computing queue and a storage address of input data to the computing module and/or a storage address of output data from the computing module in accordance with the pre-stored configuration file, and include the identifier of the computing module, the storage address of the input data and/or the storage address of the output data in the call request. In a particular application scenario, information carried in the call request can be distinguished based on different computing modules. For example, the identifier of the computing module, the storage address of the input data and the storage address of the output data can be carried in the call request. Alternatively, the identifier of the computing module and the storage address of the output data can be carried in the call request, or the identifier of the computing module and the storage address of the input data can be carried in the call request.

Here, the storage address of the output data from the computing module can be an address corresponding to the computing module in a shared storage space corresponding to the slave process in which the computing module is included. Alternatively, the storage address of the output data can be an address corresponding to the computing module in a shared storage space corresponding to another slave process, i.e., the other slave process has a storage address corresponding to the computing module. The storage address of the input data to the computing module can be an address in the shared storage space corresponding to the slave process in which the computing module is included.

That is, each slave process has a corresponding shared storage space, in which each computing module of the slave process has a corresponding storage space. Each computing module writes its processing result, i.e., output data, into its corresponding storage space. In accordance with the computation direction, when the output data from one computing module is the input data to another computing module, the storage address of the input data to the other computing module is the storage address of the output data from the computing module.

When one computing module needs output data from another computing module in the same slave process as its input data, the master thread includes the address of the storage space for the other computing module in the call request, as the storage address of the input data to the computing module. The computing module reads its required input data directly from the storage space corresponding to the other computing module based on the call request.

When a computing module B in a current slave process needs output data from a computing module A in another slave process as its input data, the master thread includes the address for the computing module A of the storage space in the current slave process in the call request transmitted to the computing module A, as the storage address of the output data from the computing module A. The computing module B obtains data from the storage address for the computing module A in the shared storage space in the current slave process as its input data. This will be further explained later in connection with the operation principle of the slave process.

At step 305, the state of the node and the state of each output edge of the node are updated upon receiving a response to the call request.

In an embodiment, upon receiving the response to the call request transmitted for one node, one slave thread in the thread pool can set the state of the node to done, modify the state of each output edge of the node into complete, and set the state of each node having all its input edges in the complete state to ready.

In this way, when the computing module corresponding to the node has completed its processing, the slave thread sets the state of the node to done and modifies the state of each output edge of the node into complete. The node in the ready state and having all its input edges in the complete state is a node to be called. According to the processing in the above step 303, the slave thread will determine the node as a node to be called and push the node into the computing queue.

At step 306, the method proceeds with a next computing period after determining that the states of all the nodes in the directed computation graph have been updated.

In an embodiment, one slave thread in the thread pool can traverse the states of the respective nodes in the directed computation graph at a head of the control queue, and when determining that the states of all the nodes in the sub-graph are done, release the directed computation graph at the head of the control queue and transmit a notification associated with the sub-graph to the master thread in the wait state, such that the master thread can proceed with the next computing period.

That is, when the states of all the nodes in the directed computation graph at the head of the control queue are done, the computing module corresponding to the directed computation graph have completed their processing in the current computing period, and the slave thread can release the directed computation graph and notify or wake the master thread in the wait state to process accordingly.

It can be seen from the above processing that, with the method for multi-module scheduling at the master process according to the embodiment of the present disclosure, the master process can control computation logics of a plurality of computing modules in a slave process. A module corresponding to a node can be called for computing or processing only when the states of all input edges of the node are complete, such that the consistency in the input data to the computing module in one computing period can be guaranteed. The situation in which a plurality of pieces of data are from different computing periods can be avoided, so as to solve the problem in the related art associated with inconsistency in data inputted to the computing module.

Further, when the master process transmits a call request to a computing module in a slave process by means of RPC, the call request carries a storage address of input data to the computing module and a storage address of output data from the computing module. The storage address of the input data and the storage address of the output data are addresses in a shared storage space corresponding to the slave process. Data communication between these computing modules can be achieved by reading and writing data in the shared storage space, so as to improve the communication efficiency between the modules, reduce the communication delay and increase the processing throughput, thereby solving the problem in the related art associated with low efficiency, high delay or low throughput in communication between the computing modules. Further, when an address of output data from a computing module is an address in a shared storage space in another slave process, the output data can be written into the shared storage space for the other slave process across the processes, so as to achieve inter-process data communication between the computing modules.

Furthermore, the master process stores directed computation graphs in a plurality of storage spaces in a control queue, respectively. Between two directed computation graphs, an output edge from a node corresponding to a serial module in a previous directed computation graph adjacent to a directed computation graph to the same node in the directed computation graph is created, such that when the serial module is to be scheduled, its execution needs to be scheduled based on the execution of the corresponding serial module in the previous directed computation graph. However, parallel modules are not subject to such constraint and can thus be executed in parallel, so as to improve processing speed.

Figure 4:
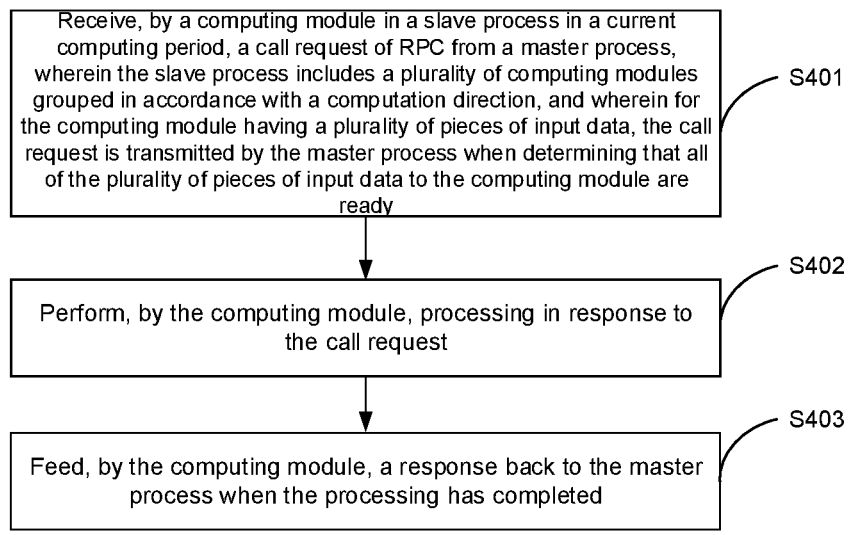
FIG. 4 is a flowchart illustrating another method for multi-module scheduling according to the present disclosure.

In an embodiment of the present disclosure, a method for multi-module scheduling is provided. The method can be applied in a slave process shown in FIG. 2. As shown in FIG. 4, the method for multi-module scheduling according to the present disclosure includes the following processing flow.

At step 401, in a current computing period, a computing module in a slave process receives a call request of RPC from a master process. The slave process includes a plurality of computing modules grouped in accordance with a computation direction. For the computing module having a plurality of pieces of input data, the call request is transmitted by the master process when determining that all of the plurality of pieces of input data to the computing module are ready.

In an embodiment, the received call request can include an identifier of the computer module, a storage address of input data to the computing module and/or a storage address of output data from the computing module. The storage address of the output data can be an address corresponding to the computing module in a shared storage space corresponding to the slave process, or the storage address of the output data can be an address corresponding to the computing module in a shared storage space corresponding to another slave process. The storage address of the input data can be an address in a shared storage space corresponding to the slave process. In a particular application scenario, the call request may carry different information depending on different computing modules. For example, the identifier of the computing module, the storage address of the input data and the storage address of the output data can be carried in the call request. Alternatively, the identifier of the computing module and the storage address of the output data can be carried in the call request, or the identifier of the computing module and the storage address of the input data can be carried in the call request.

In another embodiment, in order to facilitate the implementation and remote call of the computing module, the computing module can be encapsulated as a service function.

At step 402, the computing module performs processing in response to the call request.

Correspondingly to the above embodiment, in response to the call request, the computing module can read the input data from the storage address of the input data for processing, and write the output data into the storage address of the output data. When the storage address of the input data and the storage address of the output data are both in the shared storage space in the current slave process, data communication between the computing modules can be performed efficiently.

Further, when the storage address of the output data from the computing module is the corresponding address in the shared storage space for the other slave process, the computing module can write the processing result as the output data into the address corresponding to the computing module in the shared storage space for the other slave process, so as to achieve inter-process data communication between the computing modules.

At step 403, the computing module feeds a response back to the master process when the processing has completed.

It can be seen from the above processing that, with the method for multi-module scheduling at the slave process according to the embodiment of the present disclosure, the slave process does not control the computation logics and the computing module performs processing in response to the call by the master process. For a computing module having a plurality of pieces of input data, the call request is transmitted by the master process when determining that all of the plurality of pieces of input data to the computing module are ready, such that the consistency in the input data to the computing module in one computing period can be guaranteed. The situation in which the plurality of pieces of data are from different computing periods can be avoided, so as to solve the problem in the related art associated with inconsistency in data inputted to the computing module.

Further, in response to the call request, the computing module in the slave process analyzes the call request to obtain the storage address of the input data to the computing module and the storage address of the output data from the computing module. The storage address of the input data and the storage address of the output data are both addresses in a shared storage space corresponding to the slave process. Data communication between these computing modules can be achieved by reading and writing data in the shared storage space, so as to improve the communication efficiency between the modules, reduce the communication delay and increase the processing throughput, thereby solving the problem in the related art associated with low efficiency, high delay or low throughput in communication between the computing modules. Further, when an address of output data from a computing module is an address in a shared storage space in another slave process, inter-process data communication between the computing modules can be achieved.

Figure 5A:
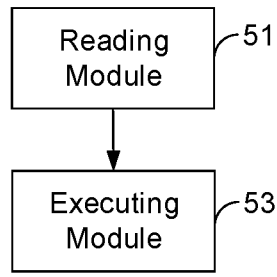
FIG. 5a is a schematic diagram showing a structure of an apparatus for multi-module scheduling according to an embodiment of the present disclosure.

Based on the same inventive concept, according to an embodiment of the present disclosure, an apparatus for multi-module scheduling is provided. As shown in FIG. 5a, the apparatus includes the following modules.

A reading module 51 is configured to read a pre-stored configuration file storing a directed computation graph associated with a computing task. The computing task includes a plurality of slave processes each including a plurality of computing modules grouped in accordance with a computation direction. The computing modules include parallel computing modules and serial computing modules. The directed computation graph includes a plurality of nodes each corresponding to one computing module in one slave process. At least two of the nodes have a connecting edge therebetween. An incoming connecting edge of a node is an input edge and an outgoing connecting edge of a node is an output edge.

A state of each node can include unready, ready, run or done. A state of each connecting edge can include uncomplete or complete.

An executing module 53 is configured to initialize states of the nodes and connecting edges in a current computing period; determine a node to be called based on the computation direction of the directed computation graph and the states of the nodes, the node to be called including a node having all of its input edges in a complete state; transmit, to the computing module in the slave process corresponding to the node to be called, a call request of RPC to execute the computing module; update the state of the node and the state of each output edge of the node upon receiving a response to the call request; and proceed with a next computing period after determining that the states of all the nodes in the directed computation graph have been updated.

Figure 5B:
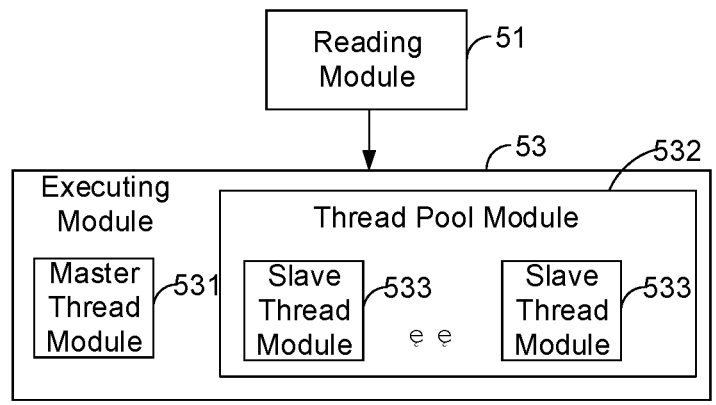
FIG. 5b is a schematic diagram showing another structure of an apparatus for multi-module scheduling according to an embodiment of the present disclosure.

In an embodiment, as shown in FIG. 5b, the executing module 53 can include a master thread module 531 and a thread pool module 532 including a plurality of slave thread modules 533.

The executing module 53 being configured to initialize the states of the nodes and connecting edges may include the master thread module 531 being configured to:

determine whether there is any free storage space in a control queue based on a predetermined time interval, and if so, store one directed computation graph in one free storage space in the control queue, or otherwise set a state of the master thread module to wait;

create, when more than one directed computation graph is stored in the control queue, an output edge from a node corresponding to each serial computing module in the directed computation graph in the (i−1)-th storage space to the same node in the directed computation graph in the i-th storage space in accordance with a direction of the queue, where $2 \leq i \leq n$ and n is a number of storage spaces in the control queue and is a natural number; and initialize the states of the nodes and connecting edges in the directed computation graph that is newly stored in the control queue.

The master thread module 531 being configured to initialize the states of the nodes and connecting edges in the directed computation graph that is newly stored in the control queue may include the master thread module 531 being configured to:

determine whether the directed computation graph that is newly stored is the first directed computation graph in the control queue, and if so, set a starting node of the directed computation graph to ready and the states of all the other nodes in the directed computation graph to unready; and set all the connecting edges in the directed computation graph to uncomplete, or otherwise, for a connecting edge from a node in a previous directed computation graph adjacent to the directed computation graph to the same node in the directed computation graph, set the state of the connecting edge to complete when the state of the node in the previous directed computation graph is done, or otherwise set the state of the connecting edge to uncomplete; set each node in the directed computation graph having all its input edges in the complete state to ready and the states of all the other nodes to unready; and set all the connecting edges in the directed computation graph to uncomplete.

The executing module 53 being configured to determine the node to be called based on the computation direction of the directed computation graph and the states of the nodes may include:

the master thread module 531 being configured to traverse, after initializing the states of the nodes and connecting edges in the directed computation graph that is newly stored in the control queue, the states of the respective nodes in each directed computation graph in the control queue in accordance with the computation direction, determine each node in the ready state as a node to be called, the node in the ready state including the node having all of its input edges in the complete state, modify the state of each node to be called into run, push each node to be called into a computing queue and enter the wait state; or one slave thread module 533 in the thread pool module 532 being configured to traverse, in computation, the states of the respective nodes in each directed computation graph in the control queue in accordance with the computation direction, determine each node in the ready state as a node to be called, the node in the ready state including the node having all of its input edges in the complete state, modify the state of each node to be called into run, and push each node to be called into a computing queue.

The executing module 53 being configured to transmit, to the computing module in the slave process corresponding to the node to be called, the call request of RPC to execute the computing module may include one slave thread module 533 in the thread pool module 532 being configured to: take one node from the computing queue and transmit the call request of RPC to the computing module in the slave process corresponding to the one node.

The slave thread module 533 may be further configured to: determine an identifier of the computing module corresponding to the one node taken from the computing queue and a storage address of input data to the computing module and/or a storage address of output data from the computing module in accordance with the pre-stored configuration file, and include the identifier of the computing module, the storage address of the input data and/or the storage address of the output data in the call request. The storage address of the output data from the computing module can be an address corresponding to the computing module in a shared storage space corresponding to the slave process in which the computing module is included, or the storage address of the output data can be an address corresponding to the computing module in a shared storage space corresponding to another slave process. The storage address of the input data to the computing module can be an address in the shared storage space corresponding to the slave process in which the computing module is included.

The executing module 53 being configured to update the state of the node and the state of each output edge of the node upon receiving the response to the call request may include one slave thread module 533 in the thread pool module 532 being configured to: set, upon receiving the response to the call request transmitted for one node, the state of the node to done, modify the state of each output edge of the node into complete, and set the state of each node having all its input edges in the complete state to ready.

The executing module 53 being configured to proceed with the next computing period after determining that the states of all the nodes in the directed computation graph have been updated may include one slave thread module 533 in the thread pool module 532 being configured to: traverse the states of the respective nodes in the directed computation graph at a head of the control queue, and when determining that the states of all the nodes in the directed computation graph are done, release the directed computation graph at the head of the control queue and notify the master thread module 531 in the wait state to proceed with the next computing period.

With the apparatus for multi-module scheduling shown in FIG. 5a or FIG. 5b, the apparatus for multi-module scheduling serving as the master process can control computation logics of a plurality of computing modules in a slave process. In one computing period, a module corresponding to a node can be called for computing or processing only when the states of all input edges of the node are complete, such that the consistency in the input data to the computing module in the one computing period can be guaranteed. The situation in which a plurality of pieces of data are from different computing periods can be avoided, so as to solve the problem in the related art associated with inconsistency in data inputted to the computing module.

Further, when the master process module transmits a call request to a computing module in a slave process by means of RPC, the call request carries a storage address of input data to the computing module and a storage address of output data from the computing module. The storage address of the input data and the storage address of the output data are addresses in a shared storage space corresponding to the slave process. Data communication between these computing modules can be achieved by reading and writing data in the shared storage space, so as to improve the communication efficiency between the modules, reduce the communication delay and increase the processing throughput, thereby solving the problem in the related art associated with low efficiency, high delay or low throughput in communication between the computing modules. Further, when an address of output data from a computing module is an address in a shared storage space in another slave process, inter-process data communication between the computing modules can be achieved.

Furthermore, the master process stores directed computation graphs in a plurality of storage spaces in a control queue, respectively. Between two directed computation graphs, an output edge from a node corresponding to a serial module in a previous directed computation graph adjacent to a directed computation graph to the same node in the directed computation graph is created, such that when the serial module is to be scheduled, its execution needs to be scheduled based on the execution of the corresponding serial module in the previous directed computation graph. However, parallel modules are not subject to such constraint and can thus be executed in parallel, so as to improve processing speed.

Figure 6:
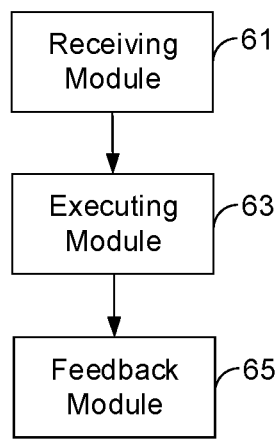
FIG. 6 is a schematic diagram showing a structure of an apparatus for multi-module scheduling according to an embodiment of the present disclosure.

Based on the same inventive concept, according to an embodiment of the present disclosure, an apparatus for multi-module scheduling is provided. The apparatus for multi-module scheduling can be applied in a slave process. As shown in FIG. 6, the apparatus includes the following modules.

A receiving module 61 is configured to receive, in a current computing period, a call request of RPC from a master process. For the apparatus for multi-module scheduling having a plurality of pieces of input data, the call request is transmitted by the master process when determining that all of the plurality of pieces of input data to the apparatus for multi-module scheduling are ready.

In an embodiment, the call request received by the receiving module may include an identifier of the computer module, a storage address of input data to the computing module and/or a storage address of output data from the computing module. The storage address of the output data can be an address corresponding to the computing module in a shared storage space corresponding to the slave process or can be an address corresponding to the computing module in a shared storage space corresponding to another slave process. The storage address of the input data can be an address in the shared storage space corresponding to the slave process.

An executing module 63 is configured to perform processing in response to the call request.

In an embodiment, the executing module 63 can be configured to read the input data from the storage address of the input data for processing, and write the output data into the storage address of the output data.

In an embodiment, when the storage address of the output data from the computing module is the address in the shared storage space corresponding to the other slave process, the computing module can write the processing result as the output data into the storage address corresponding to the apparatus for multi-module scheduling in the shared storage space for the other slave process.

A feedback module 65 is configured to feed a response back to the master process when the processing by the executing module has completed.

With the apparatus for multi-module scheduling at the slave process according to the embodiment of the present disclosure, the slave process does not control the computation logics and the apparatus for multi-module scheduling operating as the computing module performs processing in response to the call by the master process. For a computing module having a plurality of pieces of input data, the call request is transmitted by the master process when determining that all of the plurality of pieces of input data to the computing module are ready, such that the consistency in the input data to the computing module in one computing period can be guaranteed. The situation in which the plurality of pieces of data are from different computing periods can be avoided, so as to solve the problem in the related art associated with inconsistency in data inputted to the computing module.

Further, in response to the call request, the computing module (apparatus for multi-module scheduling) in the slave process analyzes the call request to obtain the storage address of the input data to the computing module and the storage address of the output data from the computing module. The storage address of the input data and the storage address of the output data are both addresses in a shared storage space corresponding to the slave process. Data communication between these computing modules (apparatuses for multi-module scheduling) can be achieved by reading and writing data in the shared storage space, so as to improve the communication efficiency between the modules (apparatuses for multi-module scheduling), reduce the communication delay and increase the processing throughput, thereby solving the problem in the related art associated with low efficiency, high delay or low throughput in communication between the computing modules. Further, when an address of output data from a computing module is an address in a shared storage space in another slave process, inter-process data communication between the computing modules can be achieved.

Figure 7:
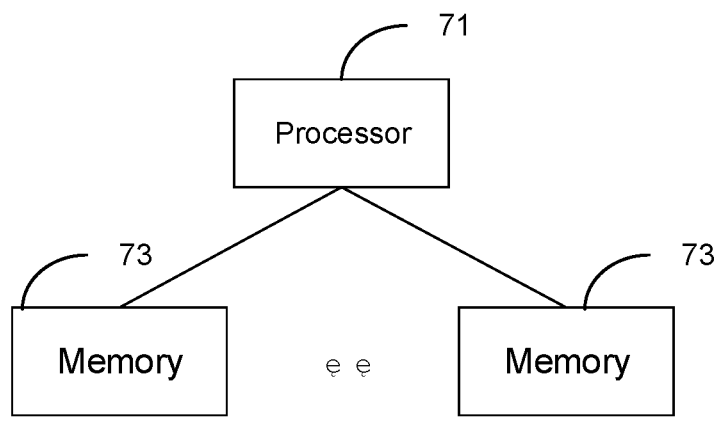
FIG. 7 is a schematic diagram showing a structure of an apparatus for multi-module scheduling according to an embodiment of the present disclosure.

Based on the same inventive concept, according to an embodiment of the present disclosure, an apparatus for multi-module scheduling is provided. As shown in FIG. 7, the apparatus includes a processor 71 and at least one memory 73 storing at least one machine executable instruction. The processor 71 is operative to execute the at least one machine executable instruction to:

read a pre-stored configuration file storing a directed computation graph associated with a computing task, the computing task including a plurality of slave processes each including a plurality of computing modules grouped in accordance with a computation direction, the directed computation graph including a plurality of nodes each corresponding to one computing module in one slave process, at least two of the nodes having a connecting edge therebetween, an incoming connecting edge of a node being an input edge and an outgoing connecting edge of a node being an output edge;

initialize, by a master process, states of the nodes and connecting edges in a current computing period;

determine a node to be called based on the computation direction of the directed computation graph and the states of the nodes, the node to be called including a node having all of its input edges in a complete state;

transmit, to the computing module in the slave process corresponding to the node to be called, a call request of RPC to execute the computing module;

update the state of the node and the state of each output edge of the node upon receiving a response to the call request; and proceed with a next computing period after determining that the states of all the nodes in the directed computation graph have been updated.

In an embodiment, the processor 71 is operative to execute the at least one machine executable instruction to provide a master thread and a thread pool including a plurality of slave threads. The state of each node can include unready, ready, run or done. The state of each connecting edge can include uncomplete or complete.

In an embodiment, the processor 71 being operative to execute the at least one machine executable instruction to initialize, by the master process, the states of the nodes and connecting edges may include the master thread being configured to: determine whether there is any free storage space in a control queue based on a predetermined time interval, and if so, store one directed computation graph in one free storage space in the control queue, or otherwise set a state of the master thread to wait; create, when more than one directed computation graph is stored in the control queue, an output edge from a node corresponding to each serial computing module in the directed computation graph in the (i−1)-th storage space to the same node in the directed computation graph in the i-th storage space in accordance with a direction of the queue, where 2≤i≤n and n is a number of storage spaces in the control queue and is a natural number; and initialize the states of the nodes and connecting edges in the directed computation graph that is newly stored in the control queue.

In an embodiment, the processor 71 being operative to execute the at least one machine executable instruction to initialize the states of the nodes and connecting edges in the directed computation graph that is newly stored in the control queue may include the master thread being configured to:

determine whether the directed computation graph that is newly stored is the first directed computation graph in the control queue, and if so, set a starting node of the directed computation graph to ready and the states of all the other nodes in the directed computation graph to unready; and set all the connecting edges in the directed computation graph to uncomplete, or otherwise, for a connecting edge from a node in a previous directed computation graph adjacent to the directed computation graph to the same node in the directed computation graph, set the state of the connecting edge to complete when the state of the node in the previous directed computation graph is done, or otherwise set the state of the connecting edge to uncomplete; set each node in the directed computation graph having all its input edges in the complete state to ready and the states of all the other nodes to unready; and set all the connecting edges in the directed computation graph to uncomplete.

In an embodiment, the processor 71 being operative to execute the at least one machine executable instruction to determine the node to be called based on the computation direction of the directed computation graph and the states of the nodes may include:

the master thread being configured to traverse, after initializing the states of the nodes and connecting edges in the directed computation graph that is newly stored in the control queue, the states of the respective nodes in each directed computation graph in the control queue in accordance with the computation direction, determine each node in the ready state as a node to be called, the node in the ready state including the node having all of its input edges in the complete state, modify the state of each node to be called into run, push each node to be called into a computing queue and enter the wait state; or one slave thread in the thread pool being configured to traverse, in computation, the states of the respective nodes in each directed computation graph in the control queue in accordance with the computation direction, determine each node in the ready state as a node to be called, the node in the ready state including the node having all of its input edges in the complete state, modify the state of each node to be called into run, and push each node to be called into a computing queue.

In an embodiment, the processor 71 being operative to execute the at least one machine executable instruction to transmit, to the computing module in the slave process corresponding to the node to be called, the call request of RPC to execute the computing module may include one slave thread in the thread pool being configured to: take one node from the computing queue and transmit the call request of RPC to the computing module in the slave process corresponding to the one node.

In an embodiment, the processor 71 may be further operative to execute the at least one machine executable instruction to: determine an identifier of the computing module corresponding to the one node taken from the computing queue and a storage address of input data to the computing module and/or a storage address of output data from the computing module in accordance with the pre-stored configuration file, and include the identifier of the computing module, the storage address of the input data and/or the storage address of the output data in the call request. The storage address of the output data from the computing module can be an address corresponding to the computing module in a shared storage space corresponding to the slave process in which the computing module is included, or the storage address of the output data can be an address corresponding to the computing module in a shared storage space corresponding to another slave process. The storage address of the input data to the computing module can be an address in the shared storage space corresponding to the slave process in which the computing module is included.

In an embodiment, the processor 71 being operative to execute the at least one machine executable instruction to update the state of the node and the state of each output edge of the node upon receiving the response to the call request may include one slave thread in the thread pool being configured to: set, upon receiving the response to the call request transmitted for one node, the state of the node to done, modify the state of each output edge of the node into complete, and set the state of each node having all its input edges in the complete state to ready.

In an embodiment, the processor 71 being operative to execute the at least one machine executable instruction to proceed with the next computing period after determining that the states of all the nodes in the directed computation graph have been updated may include one slave thread in the thread pool being configured to: traverse the states of the respective nodes in the directed computation graph at a head of the control queue, and when determining that the states of all the nodes in the directed computation graph are done, release a storage space at the head of the control queue and notify the master thread in the wait state to proceed with the next computing period.

Figure 8:
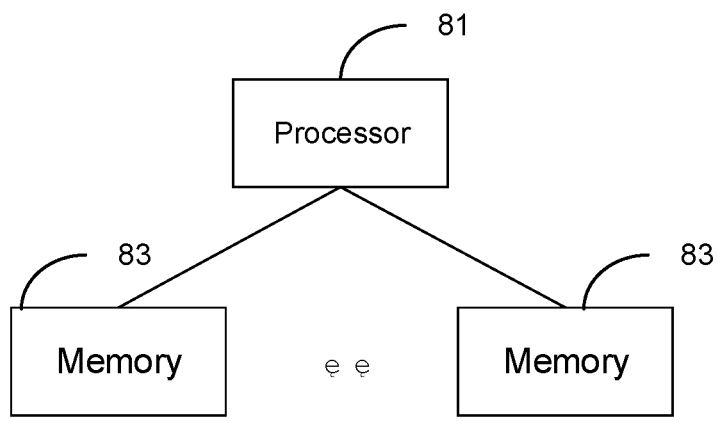
FIG. 8 is a schematic diagram showing a structure of an apparatus for multi-module scheduling according to an embodiment of the present disclosure.

Based on the same inventive concept, according to an embodiment of the present disclosure, an apparatus for multi-module scheduling is provided. As shown in FIG. 8, the apparatus includes a processor 81 and at least one memory 83 storing at least one machine executable instruction. The processor 81 is operative to execute the at least one machine executable instruction to: receive, in a current computing period, a call request of RPC from a master process, wherein for the apparatus for multi-module scheduling having a plurality of pieces of input data, the call request is transmitted by the master process when determining that all of the plurality of pieces of input data to the apparatus for multi-module scheduling are ready; perform processing in response to the call request; and feed a response back to the master process when the processing has completed.

In an embodiment, the processor 81 may be further operative to execute the at least one machine executable instruction such that the received call request includes an identifier of the computer module, a storage address of input data to the computing module and/or a storage address of output data from the computing module, the storage address of the output data being an address corresponding to the computing module in a shared storage space corresponding to the slave process or being an address corresponding to the computing module in a shared storage space corresponding to another slave process, and the storage address of the input data being an address in the shared storage space corresponding to the slave process.

In an embodiment, the processor 81 being operative to execute the at least one machine executable instruction to perform processing in response to the call request may include the processor being operative to execute the at least one machine executable instruction to: read, in response to the call request, the input data from the storage address of the input data for processing, and write the output data into the storage address of the output data.

In the following, an implementation of the solutions according to the present disclosure in a particular application scenario will be described.

The method for multi-module scheduling according to the present disclosure can be applied in deep learning in the automated driving technology.

As shown in FIG. 1, in the related art, a deep learning task in the automated driving technology typically includes the following modules: camera (sensor), vehicle detection, vehicle tracking, segmentation and fusion. The camera module captures images of a driving environment of a self-driving vehicle. The vehicle detection module identifies a position of the vehicle in each frame of image captured by the camera. The vehicle tracking module receives a sequence of consecutive frames of images outputted from the vehicle detection module as its input and identifies the same vehicle in the sequence of consecutive frames of images. The segmentation module identifies a position of a lane line. The fusion module calculates information on a road condition around the vehicle based on outputs from a plurality of vehicle mounted tracking modules.

Figure 9A:
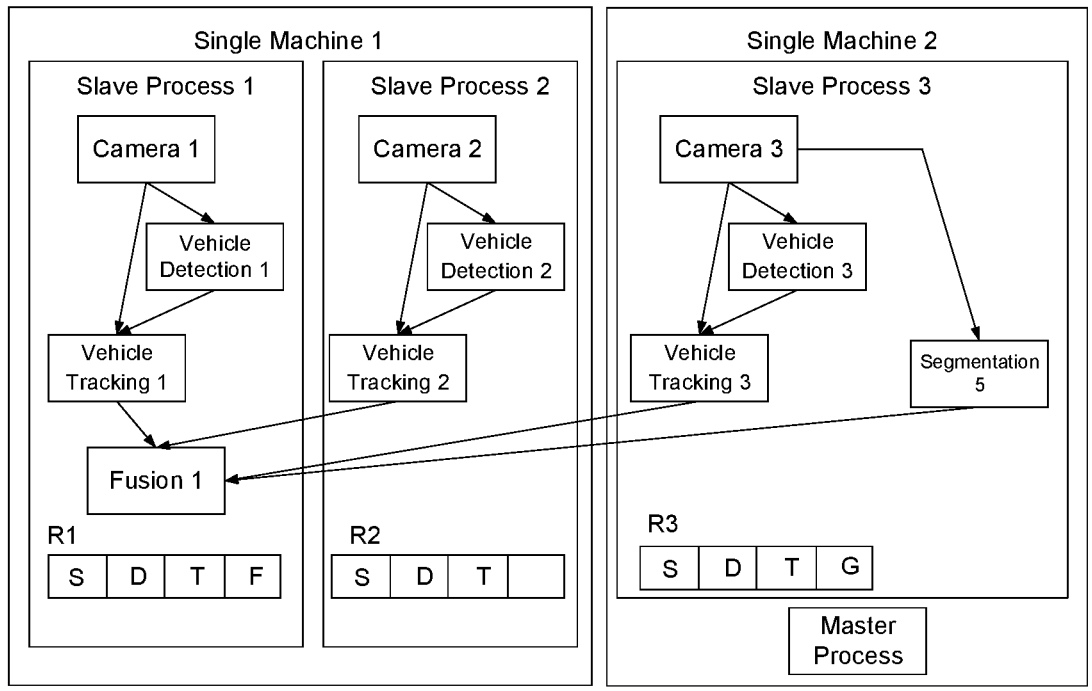
FIG. 9a is a schematic diagram showing a structure of a system for multi-module scheduling in an application scenario according to an embodiment of the present disclosure.

The solution of multi-module scheduling according to the present disclosure can be applied in a deep learning task in the automated driving technology. As shown in FIG. 9a, one Master Process and three Slave Processes (Servers) are provided. Slave Process 1 includes the following computing modules: Camera 1, Vehicle Detection 1, Vehicle Tracking 1 and Fusion 1. Slave Process 2 includes the following computing modules: Camera 2, Vehicle Detection 2 and Vehicle Tracking 2. Slave Process 3 includes the following computing modules: Camera 3, Vehicle Detection 3, Vehicle Tracking 3 and Segmentation 5. Slave Process 1 and Slave Process 2 are provided on Single Machine 1, and Master Process and Slave Process 3 are provided on Single Machine 2. In FIG. 9a, unidirectional arrows between computing modules represent computation directions and data transmission directions. For example, in Slave Process 1, input data to Vehicle Detection 1 is output data from Camera 1, input data to Vehicle Tracking 1 includes the output data from Camera 1 and output data from Vehicle Detection 1, input data to the computing module Fusion 1 includes output data from Vehicle Tracking 1 in Slave Process 1, output data from Vehicle Tracking 2 in Slave Process 2, output data from Vehicle Tracking 3 in Slave Process 3 and output data from Segmentation 5 in Slave Process 3. The same also applies to computation directions in the other slave processes and details thereof will be omitted here.

Each slave process is assigned with a shared storage space in which each computing module of the slave process is assigned with a corresponding storage address. As shown in FIG. 9a, shared storage spaces R1-R3 are assigned for Slave Processes 1-3, respectively. In the shared storage space for Slave Process 1, storage spaces R1-S, R1-D, R1-T and R1-F are assigned for Camera 1, Vehicle Detection 1, Vehicle Tracking 1 and Fusion 1, respectively. Similarly, the shared storage space for Slave Process 2 includes R2-S, R2-D and R2-T, and the shared storage space for Slave Process 3 includes R3-S, R3-D, R3-T and R3-G. Data transmission between the computing modules can be achieved by writing output data into a corresponding storage space and reading input data from the shared storage space.

It can be seen from further analysis of FIG. 9a that the module Fusion 1 needs to read input data from different processes. That is, the module Fusion 1 needs not only the output data from the module Vehicle Tracking 1 in the same slave process, but also the output data from the module Vehicle Tracking 2 in Slave Process 2, the output data from the module Vehicle Tracking 3 in Slave Process 3 and the output data from the module Segmentation 5 in Slave Process 3. Data communication within one slave process can be performed by reading and writing data in the shared storage space, but data communication between computing modules of different slave processes cannot be performed in the same way.

Figure 9B:
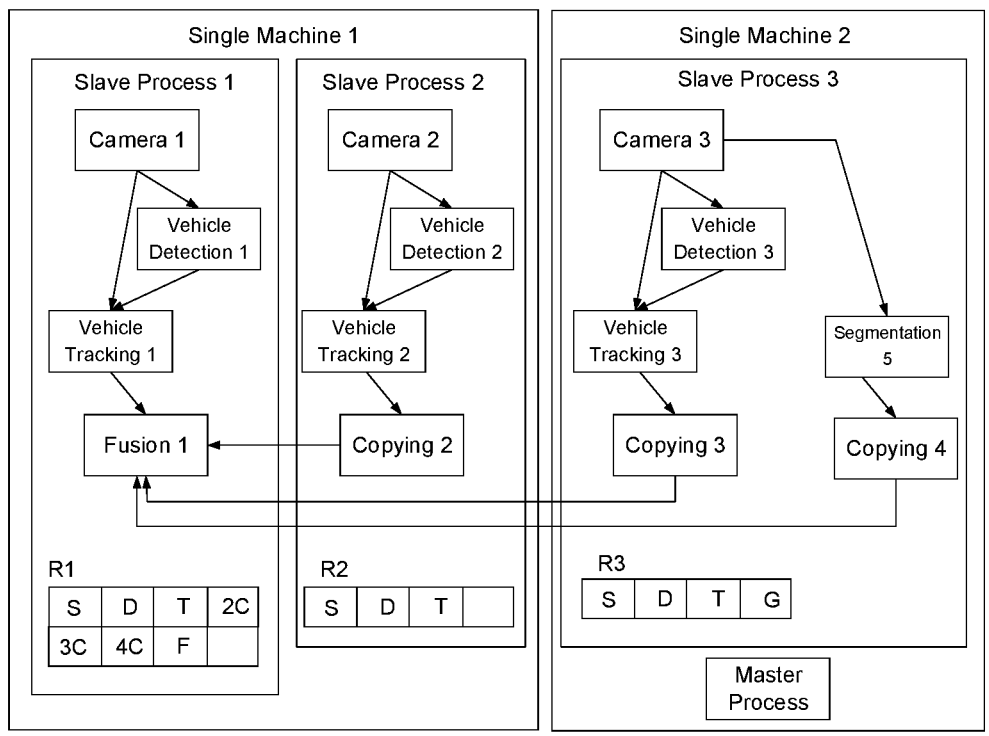
FIG. 9b is a schematic diagram showing another structure of a system for multi-module scheduling in an application scenario according to an embodiment of the present disclosure.

In order to solve this problem, in the deep learning task, a copying module can be provided for each of those modules that need inter-process data communication. A storage address in an inter-process shared storage space can be assigned for each copying module as the storage address of the output data, and the storage address of the output data can be carried in the call request of RPC transmitted from Master Process to each copying module. As shown in FIG. 9b, in the shared storage space for Slave Process 1, respective storage spaces, R1-2C, R1-3C and R1-4C, are assigned for a copying module 4' in Slave Process 2, a copying module 4" in Slave Process 3 and a copying module 4' in Slave Process 3.

As shown in FIG. 9b, in response to the RPC request from Master Process, the copying module 2 reads data from the storage space R2-T corresponding to Vehicle Tracking 2 in the shared storage space for Slave Process 2 and writes the read data, as output data, into the storage address R1-2C corresponding to the copying module 2 in the shared storage space for Slave Process 1. The operation principles of the copying module 3 and the copying module 4 are similar.

With the copying modules, inter-process data transmission between the computing modules can be achieved.

Further, in FIG. 9a, the computing modules Vehicle Detection 1, Vehicle Detection 2 and Vehicle Detection 3 are three parallel computing modules having the same computation timing, while other modules are serial computing modules. The copying modules in FIG. 9b are not modules for executing the learning task and do not belong to parallel computing modules or serial computing modules.

Figure 9C:
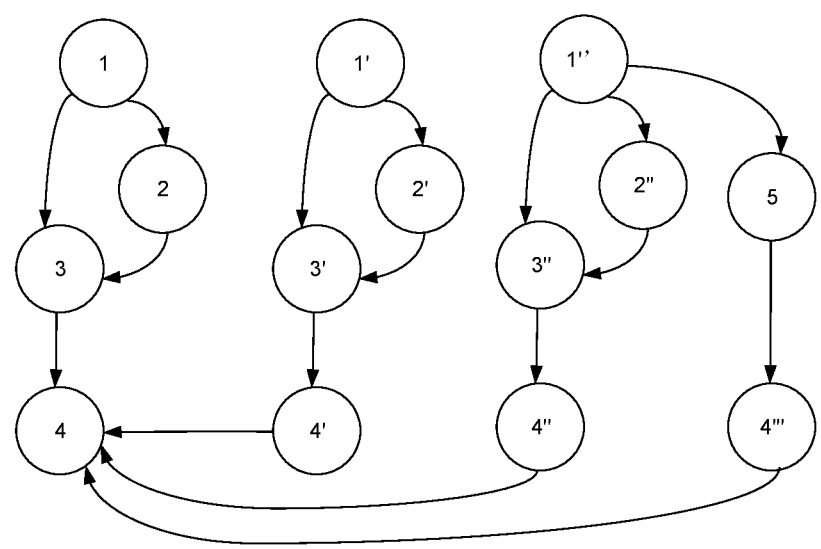
FIG. 9c is a schematic diagram showing a directed computation graph according to some embodiments of the present disclosure.

Correspondingly to FIG. 9b, a configuration file is generated in advance for the deep learning task. The configuration file has a directed computation graph stored therein, as shown in FIG. 9c. Here, correspondingly to Slave Process 1, Node 1 represents Camera 1, Node 2 represents Vehicle Detection 1, Node 3 represents Vehicle Tracking 1, and Node 4 represents the Fusion module. Correspondingly to Slave Process 2, Node 1' represents Camera 2, Node 2' represents Vehicle Detection 2, Node 3' represents Vehicle Tracking 2. Correspondingly to Slave Process 3, Node 1" represents Camera 3, and Node 2" represents Vehicle Detection 3, Node 3" represents Vehicle Tracking 3, and Node 5 represents the module Segmentation 5 in Slave Process 3. Moreover, Node 4' represents the copying module 2 in Slave Process 2, Node 4" represents the copying module 3 in Slave Process 3, and Node 4''' represents the copying module 4 in Slave Process 3.

Figure 10:
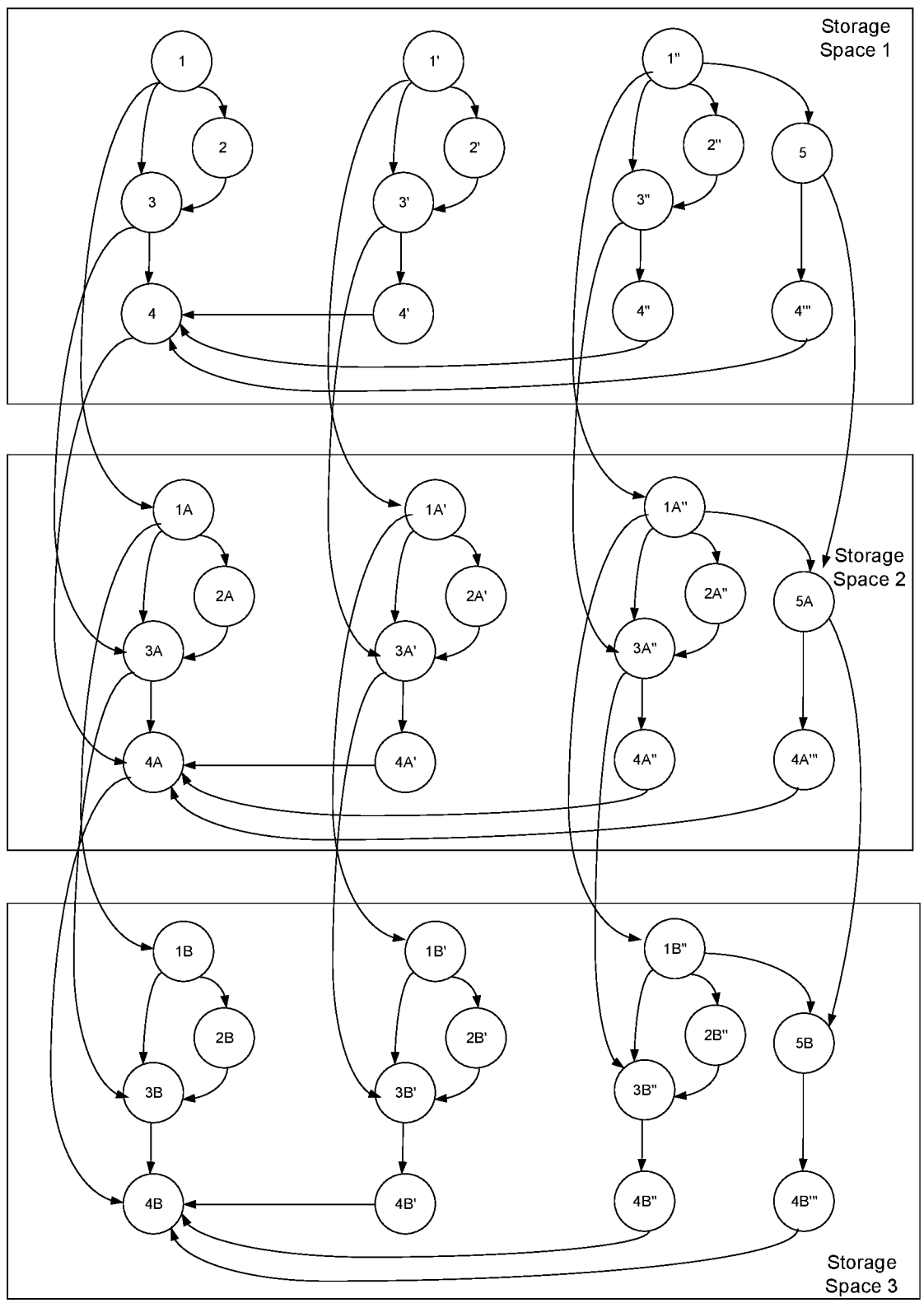
FIG. 10 is a schematic diagram showing directed computation graphs stored in a control queue.

FIG. 10 shows directed computation graphs Master Process reads sequentially into three free storage spaces in a control queue at a predetermined time interval (e.g., 20 ms). In order to distinguish among the directed computation graphs in the different storage spaces, each node in Storage Space 2 has a suffix "A" (for example, Node 1A corresponds to Node 1 in FIG. 9c and Node 1A' corresponds to Node 1' in FIG. 9c) and each node in Storage Space 3 has a suffix "B" (for example, Node 1B corresponds to Node 1 in FIG. 9c and Node 1B' corresponds to Node 1' in FIG. 9c). After storing the directed computation graphs sequentially into the control queue, in processing, Master Process will create an output edge for nodes corresponding to a serial module between two adjacent directed computation graphs, e.g., an output edge from Node 1 to Node 1A or an output edge from Node 1A to Node 1B. The same also applies to other nodes and details thereof will be omitted here. For the purpose of reference and explanation, FIG. 10 shows a schematic diagram in which the connecting edges among the directed computation graphs have been created. In FIG. 10, unidirectional arrows between computing modules represent computation directions and data transmission directions, which are the same as those shown in FIG. 9.

Referring to processing flow tables listed in FIGS. 11a-c, the processing flow for the computing modules shown in FIG. 9b will be described below as a general processing flow. In FIGS. 11a-c, a "slave process" represents a slave process that performs processing; a "called node" represents a node taken by a slave process from a computing queue; "input data" represents input data to a computing module corresponding to a called node while processing; "output data" represents output data to a computing module corresponding to a called node while processing; an "updated connecting edge after processing has completed" represents an output edge of a corresponding node as updated by a slave process after a computing module's processing has completed; and a "ready node" represents a node determined by a salve process or a master process to be in a ready state based on an updated connecting edge.

Step S1: A master thread in Master Process reads a configuration file to obtain a directed computation graph as shown in FIG. 9c.

Step S2: The master thread determines whether there is any free storage space in a control queue. If so (i.e., when there is a free storage space in a control queue), the processing proceeds with step S5; or otherwise (i.e., when there is no free storage space in a control queue), the processing proceeds with step S3.

Step S3: The master thread enters a wait state.

Step S4: The master thread in the wait state receives a notification from a slave thread and the processing returns to the step S2.

Step S5: The master thread stores a directed computation graph as a sub-graph at the tail of the control queue at a predetermined time interval (e.g., 20 ms).

In particular, Sub-Graph 1 is stored in Storage Space 1 in the control queue.

Step S6: The master thread determines whether more than one directed computation graph is stored in the control queue. If so, the processing proceeds with step S7; otherwise the processing proceeds with step S9.

Step S7: The master thread creates a connecting edge, which is an output edge, between a node corresponding to each serial computing module in a previous sub-graph and the same node in the newly stored current sub-graph.

Step S8: The connecting edge is set to complete if the state of the corresponding node in the previous sub-graph is done, or to uncomplete otherwise.

Step S9: The master thread sets each node in the newly stored sub-graph having all its input edges in the complete state to ready and the states of all the other nodes to unready, and sets the states of all the connecting edges to uncomplete.

In particular, the master thread sets the states of starting nodes, Node 1, Node 1' and Node 1", in Sub-Graph 1 to ready and the states of all other nodes in the three sub-graphs to unready, and sets the states of the reverse connecting edges 3B-3, 3B'-3' and 3B"-3" to complete and the states of all other connecting edges to uncomplete.

Step S10: The master thread modifies the state of each node in the ready state into run, and pushes each node in the run state into a computing queue, and the processing returns to the step S2.

In particular, the master thread modifies the states of Node 1, Node 1' and Node 1" in Sub-Graph 1 into run and pushes Node 1, Node 1' and Node 1" into the computing queue, and the processing returns to the step S2.

After returning to step S2, Master Process performs the steps S2 and S5-S10. Sub-Graph 2 is written into Storage Space 2 at the tail of the control queue. When the computing modules corresponding to Node 1, Node 1' and Node 1" in Sub-Graph 1 have not completed their processing and are not in the done state, the processing returns to the step S2. When the computing modules corresponding to Node 1, Node 1' and Node 1" in Sub-Graph 1 have completed their processing and are in the done state, Node 1A, Node 1A' and Node 1A" in Sub-Graph 2 are pushed into the computing queue; or otherwise the processing returns to the step S2. (Note that in the following description, it is assumed that the computing modules corresponding to Node 1, Node 1' and Node 1" have not completed their processing and are not in the done state).

Master Process proceeds with the steps S2 and S5-S10. Sub-Graph 3 is written into Storage Space 3 at the tail of the control queue. When the computing modules corresponding to Node 1A, Node 1A' and Node 1A" in Sub-Graph 2 have not completed their processing and are not in the done state, the processing returns to the step S2. When the computing modules corresponding to Node 1A, Node 1A' and Node 1A" in Sub-Graph 2 have completed their processing and are in the done state, Node 1B, Node 1B' and Node 1B" in Sub-Graph 3 are pushed into the computing queue, and the processing returns to the step S2 and then proceeds with the step S3. (Note that in the following description, it is assumed that the computing modules corresponding to Node 1A, Node 1A' and Node 1A" have not completed their processing and are not in the done state).

Note that in the following description, there is no correspondence between the slave threads in the thread pool and the slave processes or the computing modules. The slave threads are described in sequence for the purpose of illustration.

Step S11: Slave Thread a in the thread pool takes Node 1 from the computing queue and transmits a call request of RPC to the computing module Camera 1 corresponding to Node 1. The request carries a storage space of output data, i.e., the storage address R1-S for Camera 1 in the shared storage space for Slave Process 1.

Slave Thread b in the thread pool takes Node 1' from the computing queue and transmits a call request of RPC to the computing module Camera 2 corresponding to Node 1'. The request carries a storage space of output data, i.e., the storage address R2-S for Camera 2 in the shared storage space for Slave Process 2.

Slave Thread c in the thread pool takes Node 1" from the computing queue and transmits a call request of RPC to the computing module Camera 3 corresponding to Node 1". The request carries a storage space of output data, i.e., the storage address R32-S for Camera 3 in the shared storage space for Slave Process 3.

Step S12: In response to the call request, Camera 1 writes obtained data T1 of a first frame of image into the storage address R1-S in Slave Process 1 and feeds a response back to Slave Thread a.

In response to the call request, Camera 2 writes obtained data T1 of a first frame of image into the storage address R2-S in Slave Process 2 and feeds a response back to Slave Thread b.

In response to the call request, Camera 3 writes obtained data T1 of a first frame of image into the storage address R3-S in Slave Process 3 and feeds a response back to Slave Thread c.

Step S13: Upon receiving the response, Slave Thread a sets the state of Node 1 to done and the sates of two output edges 1-2, 1-3 and 1-1A of Node 1 to complete.

Upon receiving the response, Slave Thread b sets the state of Node 1' to done and the sates of three output edges 1'-2', 1'-3' and 1'-1A' of Node 1' to complete.

Upon receiving the response, Slave Thread c sets the state of Node 1" to done and the sates of four output edges 1"-2", 1"-3", 1"-5 and 1"-1A" of Node 1" to complete.

Step S14: Slave Thread a modifies the states of Node 2 and Node 1A having their respective input edges in the complete state into ready.

Slave Thread b modifies the states of Node 2' and Node 1A' having their respective input edges in the complete state into ready.

Slave Thread c modifies the states of Node 2", Node 5 and Node 1A" having their respective input edges in the complete state into ready.

Step S15: Slave Thread a traverses the states of the respective nodes in the directed computation graph, sets the states of Node 2 and Node 1A in the ready state to run, and pushes Node 2 and Node 1A into the computing queue.

Slave Thread b traverses the states of the respective nodes in the directed computation graph, sets the states of Node 2' and Node 1A' in the ready state to run, and pushes Node 2' and Node 1A' into the computing queue.

Slave Thread c traverses the states of the respective nodes in the directed computation graph, sets the states of Node 2", Node 5 and Node 1A" in the ready state to run, and pushes Node 2", Node 5 and Node 1A" into the computing queue.

Step S16: Slave Thread a takes Node 2 from the computing queue and transmits a call request of RPC to the module Vehicle Detection 1 corresponding to Node 2. The request carries a storage address of input data, which is the storage address R1-S for Camera 1 in the shared storage space for Slave Process 1, and a storage address of output data, which is the storage address R1-D for Vehicle Detection 1 in the shared storage space for Slave Process 1.

Slave Thread b takes Node 1A from the computing queue and transmits a call request of RPC to the module Camera 1 corresponding to Node 1A. The request carries a storage address of output data, which is the storage address R1-S for Camera 1 in the shared storage space for Slave Process 1.

Slave Thread c takes Node 2' from the computing queue and transmits a call request of RPC to the module Vehicle Detection 2 corresponding to Node 2'. The request carries a storage address of input data, which is the storage address R2-S for Camera 2 in the shared storage space for Slave Process 2, and a storage address of output data, which is the storage address R2-D for Vehicle Detection 2 in the shared storage space for Slave Process 2.

Slave Thread d takes Node 1A' from the computing queue and transmits a call request of RPC to the module Camera 2 corresponding to Node 1A'. The request carries a storage address of output data, which is the storage address R2-S for Camera 2 in the shared storage space for Slave Process 2.

Slave Thread e takes Node 2" from the computing queue and transmits a call request of RPC to the module Vehicle Detection 3 corresponding to Node 2". The request carries a storage address of input data, which is the storage address R3-S for Camera 3 in the shared storage space for Slave Process 3, and a storage address of output data, which is the storage address R3-D for Vehicle Detection 3 in the shared storage space for Slave Process 3.

Slave Thread f takes Node 5 from the computing queue and transmits a call request of RPC to the module Segmentation 5 corresponding to Node 5. The request carries a storage address of input data, which is the storage address R3-S for Camera 3 in the shared storage space for Slave Process 3, and a storage address of output data, which is the storage address R3-G for the module Segmentation 5 in the shared storage space for Slave Process 3.

Slave Thread g takes Node 1A" from the computing queue and transmits a call request of RPC to the module Camera 3 corresponding to Node 1A". The request carries a storage address of output data, which is the storage address R3-S for Camera 3 in the shared storage space for Slave Process 3.

Step S17: In response to the call request, Vehicle Detection 1 reads the input data T1 from the shared storage space for Slave Process 1 for processing, writes output data T11 into the storage address of output data as designated in the call request, and feeds a response back to Slave Thread a.

In response to the call request, Camera 1 writes obtained data T2 of a second frame of image into a storage address of output data as designated in the call request, and feeds a response back to Slave Thread b.

In response to the call request, Vehicle Detection 2 reads the input data T1 from the shared storage space for Slave Process 2 for processing, writes output data T12 into the storage address of output data as designated in the call request, and feeds a response back to Slave Thread c.

In response to the call request, Camera 2 writes obtained data T2 of a second frame of image into a storage address of output data as designated in the call request, and feeds a response back to Slave Thread d.

In response to the call request, Vehicle Detection 3 reads the input data T1 from the shared storage space for Slave Process 3 for processing, writes output data T13 into the storage address of output data as designated in the call request, and feeds a response back to Slave Thread e.

In response to the call request, the module Segmentation 5 reads the input data T1 from the shared storage space for Slave Process 3 for processing, writes output data T15 into the storage address of output data as designated in the call request, and feeds a response back to Slave Thread f.

In response to the call request, Camera 3 writes obtained data T2 of a second frame of image into a storage address of output data as designated in the call request, and feeds a response back to Slave Thread g.

Step S18: Upon receiving the response, Slave Thread a sets the state of Node 2 to done and the state of one output edge 2-3 of Node 2 to complete.

Upon receiving the response, Slave Thread b sets the state of Node 1A to done and the states of three output edges 1A-2A, 1A-3A and 1A-1B of Node 1A to complete.

Upon receiving the response, Slave Thread c sets the state of Node 2' to done and the state of one output edge 2'-3' of Node 2' to complete.

Upon receiving the response, Slave Thread d sets the state of Node 1A' to done and the states of three output edges 1A'-2A', 1A'-3A' and 1A'-1B' of Node 1A' to complete.

Upon receiving the response, Slave Thread e sets the state of Node 2" to done and the state of one output edge 2"-3" of Node 2" to complete.

Upon receiving the response, Slave Thread f sets the state of Node 5 to done and the state of one output edge 5-4''' and 5-5A of Node 5 to complete.

Upon receiving the response, Slave Thread g sets the state of Node 1A" to done and the states of four output edges 1A"-2A", 1A"-3A", 1A"-1B" and 1A"-5A of Node 1A" to complete.

Step S19: Slave Thread a modifies the state of Node 3 having its input edges 1-3 and 2-3 in the complete state into ready.

Slave Thread b modifies the states of Node 2A having its input edge 1A-2A in the complete state and Node 1B having its input edge 1A-1B in the complete state into ready.

Slave Thread c modifies the state of Node 3' having its input edges 1'-3' and 2'-3' in the complete state into ready.

Slave Thread d modifies the states of Node 2A' having its input edge 1A'-2A' in the complete state and Node 1B' having its input edge 1A'-1B' in the complete state into ready.

Slave Thread e modifies the state of Node 3" having its input edges 1"-3" and 2"-3" in the complete state into ready.

Slave Thread f modifies the state of Node 4''' having its input edge 5-4''' in the complete state into ready.

Slave Thread g modifies the states of Node 2A" having its input edge 1A"-2A" in the complete state, Node 5A having its input edges 1A"-5A and 5-5A in the complete state and Node 1B" having its input edge 1A"-1B" in the complete state into ready.

Step S20: Slave Thread a traverses the states of the respective nodes in the directed computation graph, sets the state of Node 3 in the ready state to run, and pushes Node 3 into the computing queue.

Slave Thread b traverses the states of the respective nodes in the directed computation graph, sets the state of Node 2A in the ready state to run, and pushes Node 2A into the computing queue.

Slave Thread c traverses the states of the respective nodes in the directed computation graph, sets the state of Node 1B in the ready state to run, and pushes Node 1B into the computing queue.

Slave Thread d traverses the states of the respective nodes in the directed computation graph, sets the state of Node 3' in the ready state to run, and pushes Node 3' into the computing queue.

Slave Thread e traverses the states of the respective nodes in the directed computation graph, sets the state of Node 2A' in the ready state to run, and pushes Node 2A' into the computing queue.

Slave Thread f traverses the states of the respective nodes in the directed computation graph, sets the state of Node 1B' in the ready state to run, and pushes Node 1B' into the computing queue.

Slave Thread g traverses the states of the respective nodes in the directed computation graph, sets the state of Node 3" in the ready state to run, and pushes Node 3" into the computing queue.

Slave Thread h traverses the states of the respective nodes in the directed computation graph, sets the state of Node 4'" in the ready state to run, and pushes Node 4'" into the computing queue.

Slave Thread i traverses the states of the respective nodes in the directed computation graph, sets the state of Node 2A" in the ready state to run, and pushes Node 2A" into the computing queue.

Slave Thread j traverses the states of the respective nodes in the directed computation graph, sets the state of Node 5A in the ready state to run, and pushes Node 5A into the computing queue.

Slave Thread k traverses the states of the respective nodes in the directed computation graph, sets the state of Node 1B" in the ready state to run, and pushes Node 1B" into the computing queue.

Step S21: Slave Thread a takes Node 3 from the computing queue and transmits a call request of RPC to the module Vehicle Tracking 1 corresponding to Node 3. The request carries storage addresses of input data, which are the storage address R1-S for Camera 1 in the shared storage space for Slave Process 1 and the storage address R1-D for Vehicle Detection 1 in the shared storage space for Slave Process 1, and a storage address of output data, which is the storage address R1-T for Vehicle Tracking 1 in the shared storage space for Slave Process 1.

Slave Thread b takes Node 2A from the computing queue and transmits a call request of RPC to the module Vehicle Detection 1 corresponding to Node 2A. The request carries a storage address of input data, which is the storage address R1-S for Camera 1 in the shared storage space for Slave Process 1, and a storage address of output data, which is the storage address R1-D for Vehicle Detection 1 in the shared storage space for Slave Process 1.

Slave Thread c takes Node 1B from the computing queue and transmits a call request of RPC to the module Camera 1 corresponding to Node 1B. The request carries a storage address of output data, which is the storage address R1-S for Camera 1 in the shared storage space for Slave Process 1.

Slave Thread d takes Node 3' from the computing queue and transmits a call request of RPC to the module Vehicle Tracking 2 corresponding to Node 3'. The request carries storage addresses of input data, which are the storage address R2-S for Camera 2 in the shared storage space for Slave Process 2 and the storage address R2-D for Vehicle Detection 2 in the shared storage space for Slave Process 2, and a storage address of output data, which is the storage address R2-T for Vehicle Tracking 2 in the shared storage space for Slave Process 2.

Slave Thread e takes Node 2A' from the computing queue and transmits a call request of RPC to the module Vehicle Detection 2 corresponding to Node 2A'. The request carries a storage address of input data, which is the storage address R2-S for Camera 2 in the shared storage space for Slave Process 2, and a storage address of output data, which is the storage address R2-D for Vehicle Detection 2 in the shared storage space for Slave Process 2.

Slave Thread f takes Node 1B' from the computing queue and transmits a call request of RPC to the module Camera 2 corresponding to Node 1B'. The request carries a storage address of output data, which is the storage address R2-S for Camera 2 in the shared storage space for Slave Process 2.

Slave Thread g takes Node 3" from the computing queue and transmits a call request of RPC to the module Vehicle Tracking 3 corresponding to Node 3". The request carries storage addresses of input data, which are the storage address R3-S for Camera 3 in the shared storage space for Slave Process 3 and the storage address R3-D for Vehicle Detection 3 in the shared storage space for Slave Process 3, and a storage address of output data, which is the storage address R3-T for Vehicle Tracking 3 in the shared storage space for Slave Process 3.

Slave Thread h takes Node 4'" from the computing queue and transmits a call request of RPC to the copying module 4 corresponding to Node 4'". The request carries a storage address of input data, which is the storage address R3-G for the module Segmentation 5 in the shared storage space for Slave Process 3, and a storage address of output data, which is the storage address R1-4C for the copying module 4 in the shared storage space for Slave Process 1.

Slave Thread i takes Node 2A" from the computing queue and transmits a call request of RPC to the module Vehicle Detection 3 corresponding to Node 2A". The request carries a storage address of input data, which is the storage address R3-S for Camera 3 in the shared storage space for Slave Process 3, and a storage address of output data, which is the storage address R3-D for Vehicle Detection 3 in the shared storage space for Slave Process 3.

Slave Thread j takes Node 5A from the computing queue and transmits a call request of RPC to Segmentation 5 corresponding to Node 5A. The request carries a storage address of input data, which is the storage address R3-S for Camera 3 in the shared storage space for Slave Process 3, and a storage address of output data, which is the storage address R3-G for Segmentation 5 in the shared storage space for Slave Process 3.

Slave Thread k takes Node 1B" from the computing queue and transmits a call request of RPC to Camera 3 corresponding to Node 1B". The request carries a storage address of output data, which is the storage address R3-S for Camera 3 in the shared storage space for Slave Process 3.

Step S22: In response to the call request, Vehicle Tracking 1 reads the input data T1 and T11 from the shared storage space for Slave Process 1 for processing, writes output data T11' into the storage address of output data as designated in the call request, and feeds a response back to Slave Thread a.

In response to the call request, Vehicle Detection 1 reads the input data T2 from the shared storage space for Slave Process 1 for processing, writes output data T21 into the storage address of output data as designated in the call request, and feeds a response back to Slave Thread b.

In response to the call request, Camera 1 reads data T3 of a third frame of image, writes the read data into a storage address of output data as designated in the call request, and feeds a response back to Slave Thread c.

In response to the call request, Vehicle Tracking 2 reads the input data T1 and T12 from the shared storage space for Slave Process 2 for processing, writes output data T12' into the storage address of output data as designated in the call request, and feeds a response back to Slave Thread d.

In response to the call request, Vehicle Detection 2 reads the input data T2 from the shared storage space for Slave Process 2 for processing, writes output data T22 into an address in a working storage space for Slave Process 2, and feeds a response back to Slave Thread e.

In response to the call request, Camera 2 writes the read data T3 into an address in the working storage space for Slave Process 2, and feeds a response back to Slave Thread f.

In response to the call request, Vehicle Tracking 3 reads the input data T1 and T13 from the shared storage space for Slave Process 3 for processing, writes output data T13' into an address in a working storage space for Slave Process 3, and feeds a response back to Slave Thread g.

In response to the call request, the copying module 4''' reads the input data T15 from the shared storage space for Slave Process 3, writes the read data as output data into an address in a working storage space for Slave Process 1, and feeds a response back to Slave Thread h.

In response to the call request, Vehicle Detection 3 reads the input data T2 from the shared storage space for Slave Process 3 for processing, writes output data T23 into an address in the working storage space for Slave Process 3, and feeds a response back to Slave Thread i.

In response to the call request, Segmentation 5 reads the input data T2 from the shared storage space for Slave Process 3 for processing, writes output data T25 into an address in the working storage space for Slave Process 3, and feeds a response back to Slave Thread j.

In response to the call request, Camera 3 writes the read data T3 of the third frame of data into an address in the working storage space for Slave Process 3, and feeds a response back to Slave Thread k.

Step S23: Upon receiving the response, Slave Thread a sets the state of Node 3 to done and the states of the output edges 3-4 and 3-3A of Node 3 to complete.

Upon receiving the response, Slave Thread b sets the state of Node 2A to done and the state of the output edge 2A-3A of Node 2A to complete.

Upon receiving the response, Slave Thread c sets the state of Node 1B to done and the states of two output edges 1B-2B and 1B-3B of Node 1B to complete.

Upon receiving the response, Slave Thread d sets the state of Node 3' to done and the states of two output edges 3'-4' and 3'-3A' of Node 3' to complete.

Upon receiving the response, Slave Thread e sets the state of Node 2A' to done and the state of the output edge 2A'-3A' of Node 2A' to complete.

Upon receiving the response, Slave Thread f sets the state of Node 1B' to done and the states of two output edges 1B'-2B' and 1B'-3B' of Node 1B' to complete.

Upon receiving the response, Slave Thread g sets the state of Node 3" to done and the states of two output edges 3"-4" and 3"-3A" of Node 3" to complete.

Upon receiving the response, Slave Thread h sets the state of Node 4''' to done and the state of one output edge 4'''-4 of Node 4''' to complete.

Upon receiving the response, Slave Thread i sets the state of Node 2A" to done and the state of one output edge 2A"-3A" of Node 2A" to complete.

Upon receiving the response, Slave Thread j sets the state of Node 5A to done and the states of two output edges 5A-4A''' and 5A-5B of Node 5A to complete.

Upon receiving the response, Slave Thread k sets the state of Node 1B" to done and the states of three output edges 1B"-2B", 1B"-3B" and 1B"-5B of Node 1B" to complete.

Step S24: Slave Thread b modifies the state of Node 3A having its input edges 1A-3A, 2A-3A and 3-3A in the complete state into ready.

Slave Thread c modifies the state of Node 2B having its input edge 1B-2B in the complete state into ready.

Slave Thread d modifies the state of Node 4' having its input edge 3'-4' in the complete state into ready.

Slave Thread e modifies the state of Node 3A' having its input edges 1A'-3A', 2A'-3A' and 3'-3A' in the complete state into ready.

Slave Thread f modifies the state of Node 2B' having its input edge 1B'-2B' in the complete state into ready.

Slave Thread g modifies the state of Node 4" having its input edge 3"-4" in the complete state into ready.

Slave Thread i modifies the state of Node 3A" having its input edges 1A"-3A", 2A"-3A" and 3"-3A" in the complete state into ready.

Slave Thread j modifies the state of Node 4A''' having its input edge 5-4''' in the complete state into ready.

Slave Thread k modifies the state of Node 2B" having its input edge 1B"-2B" in the complete state into ready, and modifies the state of Node 5B having its input edge 1B"-5B in the complete state into ready.

Step S25: Slave Thread b traverses the states of the respective nodes in the directed computation graph, sets the state of Node 3A in the ready state to run, and pushes Node 3A into the computing queue.

Slave Thread c traverses the states of the respective nodes in the directed computation graph, sets the state of Node 2B in the ready state to run, and pushes Node 2B into the computing queue.

Slave Thread d traverses the states of the respective nodes in the directed computation graph, sets the state of Node 4' in the ready state to run, and pushes Node 4' into the computing queue.

Slave Thread e traverses the states of the respective nodes in the directed computation graph, sets the state of Node 3A' in the ready state to run, and pushes Node 3A' into the computing queue.

Slave Thread f traverses the states of the respective nodes in the directed computation graph, sets the state of Node 2B' in the ready state to run, and pushes Node 2B' into the computing queue.

Slave Thread g traverses the states of the respective nodes in the directed computation graph, sets the state of Node 4" in the ready state to run, and pushes Node 4" into the computing queue.

Slave Thread i traverses the states of the respective nodes in the directed computation graph, sets the state of Node 3A" in the ready state to run, and pushes Node 3A" into the computing queue.

Slave Thread j traverses the states of the respective nodes in the directed computation graph, sets the state of Node 4A''' in the ready state to run, and pushes Node 4A''' into the computing queue.

Slave Thread k traverses the states of the respective nodes in the directed computation graph, sets the states of Nodes 2B" and Node 5B in the ready state to run, and pushes Nodes 2B" and Node 5B into the computing queue.

Step S26: Slave Thread a takes Node 3A from the computing queue and transmits a call request of RPC to the module Vehicle Tracking 1 corresponding to Node 3A. The request carries storage addresses of input data, which are the storage address R1-S for Camera 1 in the shared storage space for Slave Process 1 and the storage address R1-D for Vehicle Detection 1 in the shared storage space for Slave Process 1, and a storage address of output data, which is the storage address R1-T for Vehicle Tracking 1 in the shared storage space for Slave Process 1.

Slave Thread b takes Node 2B from the computing queue and transmits a call request of RPC to the module Vehicle Detection 1 corresponding to Node 2B. The request carries a storage address of input data, which is the storage address R1-S for Camera 1 in the shared storage space for Slave Process 1, and a storage address of output data, which is the storage address R1-D for Vehicle Detection 1 in the shared storage space for Slave Process 1.

Slave Thread c takes Node 4' from the computing queue and transmits a call request of RPC to the copying module 2 corresponding to Node 4'. The request carries a storage address of input data, which is the storage address R2-T for Vehicle Tracking 2 in the shared storage space for Slave Process 2, and a storage address of output data, which is the storage address R1-2C for the copying module 2 in the shared storage space for Slave Process 1.

Slave Thread d takes Node 3A' from the computing queue and transmits a call request of RPC to the module Vehicle Tracking 2 corresponding to Node 3A'. The request carries storage addresses of input data, which are the storage address R2-S for Camera 2 in the shared storage space for Slave Process 2 and the storage address R2-D for Vehicle Detection 2 in the shared storage space for Slave Process 2, and a storage address of output data, which is the storage address R2-T for Vehicle Tracking 2 in the shared storage space for Slave Process 2.

Slave Thread e takes Node 2B' from the computing queue and transmits a call request of RPC to the module Vehicle Detection 2 corresponding to Node 2B'. The request carries a storage address of input data, which is the storage address R2-S for Camera 2 in the shared storage space for Slave Process 2, and a storage address of output data, which is the storage address R2-D for Vehicle Detection 2 in the shared storage space for Slave Process 2.

Slave Thread f takes Node 4" from the computing queue and transmits a call request of RPC to the copying module 3 corresponding to Node 4". The request carries a storage address of input data, which is the storage address R3-T for Vehicle Tracking 3 in the shared storage space for Slave Process 3, and a storage address of output data, which is the storage address R1-3C for the copying module 3 in the shared storage space for Slave Process 1.

Slave Thread g takes Node 3A" from the computing queue and transmits a call request of RPC to the module Vehicle Tracking 3 corresponding to Node 3A". The request carries storage addresses of input data, which are the storage address R3-S for Camera 3 in the shared storage space for Slave Process 3 and the storage address R3-D for Vehicle Detection 3 in the shared storage space for Slave Process 3, and a storage address of output data, which is the storage address R3-T for Vehicle Tracking 3 in the shared storage space for Slave Process 3.

Slave Thread h takes Node 4A''' from the computing queue and transmits a call request of RPC to the copying module 4 corresponding to Node 4A'''. The request carries a storage address of input data, which is the storage address R3-G for the module Segmentation 5 in the shared storage space for Slave Process 3, and a storage address of output data, which is the storage address R1-4C for the copying module 4 in the shared storage space for Slave Process 1.

Slave Thread i takes Node 2B" from the computing queue and transmits a call request of RPC to the module Vehicle Detection 3 corresponding to Node 2B". The request carries a storage address of input data, which is the storage address R3-S for Camera 3 in the shared storage space for Slave Process 3, and a storage address of output data, which is the storage address R3-D for Vehicle Detection 3 in the shared storage space for Slave Process 3.

Slave Thread j takes Node 5B from the computing queue and transmits a call request of RPC to Segmentation 5 corresponding to Node 5B. The request carries a storage address of input data, which is the storage address R3-S for Camera 3 in the shared storage space for Slave Process 3, and a storage address of output data, which is the storage address R3-G for Segmentation 5 in the shared storage space for Slave Process 3.

Step S27: In response to the call request, Vehicle Tracking 1 reads the input data T2 and T21 from the shared storage space for Slave Process 1 for processing, writes output data T21' into an address in the working storage space for Slave Process 1, and feeds a response back to Slave Thread a.

In response to the call request, Vehicle Detection 1 reads the input data T3 from the shared storage space for Slave Process 1 for processing, writes output data T31 into an address in the working storage space for Slave Process 1, and feeds a response back to Slave Thread b.

In response to the call request, the copying module 2 reads the input data T12' from the shared storage space for Slave Process 2, writes the output data T12' into an address in the working storage space for Slave Process 1, and feeds a response back to Slave Thread c.

In response to the call request, Vehicle Tracking 2 reads the input data T2 and T22 from the shared storage space for Slave Process 2 for processing, writes output data T22' into an address in the working storage space for Slave Process 2, and feeds a response back to Slave Thread d.

In response to the call request, Vehicle Detection 2 reads the input data T3 from the shared storage space for Slave Process 2 for processing, writes output data T32 into an address in the working storage space for Slave Process 2, and feeds a response back to Slave Thread e.

In response to the call request, the copying module 3 reads the input data T13' from the shared storage space for Slave Process 3, writes the read data as output data into an address in the working storage space for Slave Process 1, and feeds a response back to Slave Thread f.

In response to the call request, Vehicle Tracking 3 reads the input data T2 and T23 from the shared storage space for Slave Process 3 for processing, writes output data T23' into an address in the working storage space for Slave Process 3, and feeds a response back to Slave Thread g.

In response to the call request, the copying module 4 reads the input data T25 from the shared storage space for Slave Process 3, writes the read data as output data into an address in a working storage space for Slave Process 1, and feeds a response back to Slave Thread h.

In response to the call request, Vehicle Detection 3 reads the input data T3 from the shared storage space for Slave Process 3 for processing, writes output data T33 into an address in the working storage space for Slave Process 3, and feeds a response back to Slave Thread i.

In response to the call request, Segmentation 5 reads the input data T3 from the shared storage space for Slave Process 3 for processing, writes output data T35 into an address in the working storage space for Slave Process 3, and feeds a response back to Slave Thread j.

Step S28: Upon receiving the response, Slave Thread a sets the state of Node 3A to done and the states of two output edges 3A-4A and 3A-3B of Node 3A to complete.

Upon receiving the response, Slave Thread b sets the state of Node 2B to done and the state of one output edge 2B-3B of Node 2B to complete.

Upon receiving the response, Slave Thread c sets the state of Node 4' to done and the state of one output edge 4'-4 of Node 4' to complete.

Upon receiving the response, Slave Thread d sets the state of Node 3A' to done and the states of two output edges 3A'-4A' and 3A'-3B' of Node 3A' to complete.

Upon receiving the response, Slave Thread e sets the state of Node 2B' to done and the state of the output edge 2B'-3B' of Node 2B' to complete.

Upon receiving the response, Slave Thread f sets the state of Node 4" to done and the state of one output edge 4"-4 of Node 4" to complete.

Upon receiving the response, Slave Thread g sets the state of Node 3A" to done and the states of the output edges 3A"-4A" and 3A"-3B" of Node 3A" to complete.

Upon receiving the response, Slave Thread h sets the state of Node 4A'" to done and the state of the output edge 4A'"-4A of Node 4A'" to complete.

Upon receiving the response, Slave Thread i sets the state of Node 2B" to done and the state of the output edge 2B"-3B" of Node 2B" to complete.

Upon receiving the response, Slave Thread j sets the state of Node 5B to done and the state of the output edge 5B-4B'" of Node 5B to complete.

Step S29: Slave Thread b modifies the state of Node 3B having all its input edges 1B-3B, 2B-3B and 3A-3B in the complete state into ready.

Slave Thread d modifies the state of Node 4A' having its sole input edge 3A'-4A' in the complete state into ready.

Slave Thread e modifies the state of Node 3B' having all its input edges 1B'-3B', 2B'-3B' and 3A'-3B' in the complete state into ready.

Slave Thread f modifies the state of Node 4 having all its input edges 3-4, 4'-4, 4"-4 and 4'"-4 in the complete state into ready.

Slave Thread g modifies the state of Node 4A" having its sole input edge 3A"-4A" in the complete state into ready.

Slave Thread i modifies the state of Node 3B" having all its input edges 1B"-3B", 2B"-3B" and 3A"-3B" in the complete state into ready.

Slave Thread j modifies the state of Node 4B'" having its sole input edge 5B-4B'" in the complete state into ready.

Step S30: Slave Thread b traverses the states of the respective nodes in the directed computation graph, sets the state of Node 3B in the ready state to run, and pushes Node 3B into the computing queue.

Slave Thread d traverses the states of the respective nodes in the directed computation graph, sets the state of Node 4A' in the ready state to run, and pushes Node 4A' into the computing queue.

Slave Thread e traverses the states of the respective nodes in the directed computation graph, sets the state of Node 3B' in the ready state to run, and pushes Node 3B' into the computing queue.

Slave Thread f traverses the states of the respective nodes in the directed computation graph, sets the state of Node 4 in the ready state to run, and pushes Node 4 into the computing queue.

Slave Thread g traverses the states of the respective nodes in the directed computation graph, sets the state of Node 4A" in the ready state to run, and pushes Node 4A" into the computing queue.

Slave Thread i traverses the states of the respective nodes in the directed computation graph, sets the state of Node 3B" in the ready state to run, and pushes Node 3B" into the computing queue.

Slave Thread j traverses the states of the respective nodes in the directed computation graph, sets the state of Node 4B'" in the ready state to run, and pushes Node 4B'" into the computing queue.

Step S31: Slave Thread b takes Node 3B from the computing queue and transmits a call request of RPC to the module Vehicle Tracking 1 corresponding to Node 3B. The request carries storage addresses of input data, which are the storage address R1-S for Camera 1 in the shared storage space for Slave Process 1 and the storage address R1-D for Vehicle Detection 1 in the shared storage space for Slave Process 1, and a storage address of output data, which is the storage address R1-T for Vehicle Tracking 1 in the shared storage space for Slave Process 1.

Slave Thread c takes Node 4A' from the computing queue and transmits a call request of RPC to the copying module 2 corresponding to Node 4A'. The request carries a storage address of input data, which is the storage address R2-T for Vehicle Tracking 2 in the shared storage space for Slave Process 2, and a storage address of output data, which is the storage address R1-2C for the copying module 2 in the shared storage space for Slave Process 1.

Slave Thread d takes Node 3B' from the computing queue and transmits a call request of RPC to the module Vehicle Tracking 2 corresponding to Node 3B'. The request carries storage addresses of input data, which are the storage address R2-S for Camera 2 in the shared storage space for Slave Process 2 and the storage address R2-D for Vehicle Detection 2 in the shared storage space for Slave Process 2, and a storage address of output data, which is the storage address R2-T for Vehicle Tracking 2 in the shared storage space for Slave Process 2.

Slave Thread e takes Node 4 from the computing queue and transmits a call request of RPC to Fusion 4 corresponding to Node 4. The request carries storage addresses of input data, which are the storage address R1-T for Vehicle Tracking 1 in the shared storage space for Slave Process 1, the storage address R1-2C for the copying module 2 in the shared storage space for Slave Process 1, the storage address R1-3C for the copying module 3 in the shared storage space for Slave Process 1, and the storage address R1-4C for the copying module 4 in the shared storage space for Slave Process 1.

Slave Thread f takes Node 4A" from the computing queue and transmits a call request of RPC to the copying module 3 corresponding to Node 4A". The request carries a storage address of input data, which is the storage address R3-T for Vehicle Tracking 3 in the shared storage space for Slave Process 3, and a storage address of output data, which is the storage address R1-3C for the copying module 3 in the shared storage space for Slave Process 1.

Slave Thread g takes Node 3B" from the computing queue and transmits a call request of RPC to the module Vehicle Tracking 3 corresponding to Node 3B". The request carries storage addresses of input data, which are the storage address R3-S for Camera 3 in the shared storage space for Slave Process 3 and the storage address R3-D for Vehicle Detection 3 in the shared storage space for Slave Process 3, and a storage address of output data, which is the storage address R3-T for Vehicle Tracking 3 in the shared storage space for Slave Process 3.

Slave Thread h takes Node 4B''' from the computing queue and transmits a call request of RPC to the copying module 4 corresponding to Node 4B'''. The request carries a storage address of input data, which is the storage address R3-G for Segmentation 5 in the shared storage space for Slave Process 3, and a storage address of output data, which is the storage address R1-4C for the copying module 4 in the shared storage space for Slave Process 1.

Step S32: In response to the call request, Vehicle Tracking 1 reads the input data T3 and T31 from the shared storage space for Slave Process 1 for processing, writes output data T31' into the storage address of output data as designated in the call request, and feeds a response back to Slave Thread b.

In response to the call request, the copying module 2 reads the input data T22' from the shared storage space for Slave Process 2, writes the output data T22' into the storage address of output data as designated in the call request, and feeds a response back to Slave Thread c.

In response to the call request, Vehicle Tracking 2 reads the input data T3 and T32 from the shared storage space for Slave Process 2 for processing, writes output data T32' into the storage address of output data as designated in the call request, and feeds a response back to Slave Thread d.

In response to the call request, Fusion 4 reads the input data T11', T12', T13' and T15 from the shared storage space for Slave Process 1 for processing, writes output data into the storage address of output data as designated in the call request, and feeds a response back to Slave Thread e.

In response to the call request, the copying module 3 reads the input data T23' from the shared storage space for Slave Process 3, writes the output data T23' into the storage address of output data as designated in the call request, and feeds a response back to Slave Thread f.

In response to the call request, Vehicle Tracking 3 reads the input data T3 and T33 from the shared storage space for Slave Process 3 for processing, writes output data T33' into the storage address of output data as designated in the call request, and feeds a response back to Slave Thread g.

In response to the call request, the copying module 4 reads the input data T35 from the shared storage space for Slave Process 3, writes the output data T35 into the storage address of output data as designated in the call request, and feeds a response back to Slave Thread h.

Step S33: Upon receiving the response, Slave Thread b sets the state of Node 3B to done and the states of the output edges 3B-4B and 3B-3 of Node 3B to complete.

Upon receiving the response, Slave Thread c sets the state of Node 4A' to done and the state of the output edge 4A'-4A of Node 4A' to complete.

Upon receiving the response, Slave Thread d sets the state of Node 3B' to done and the states of the output edges 3B'-4B' and 3B'-3 of Node 3B' to complete.

Upon receiving the response, Slave Thread e sets the state of Node 4 to done and the state of the output edge 4-4A of Node 4 to complete.

Further, Slave Thread e traverses Sub-Graph 1, determines that the states of all the nodes in Sub-Graph 1 are done, and releases Storage Space 1 at the head of the control queue. In this case, Storage Space 2 in which Sub-Graph 2 is stored becomes the head of the control queue and the released Storage Space 1 is now at the tail of the control queue. Slave Thread e transmits a notification to the master thread. Upon receiving the notification, the master thread performs the above steps S2 and S5-10. That is, it stores a directed computation graph, i.e., Sub-Graph 4 (not shown in FIG. 10) at the tail of the control queue and creates an output edge from a node corresponding to each serial module in Sub-Graph 3 to the corresponding node in Sub-Graph 4. The master thread initializes states of the nodes and connecting edges in the newly stored Sub-Graph 4. In particular, Node 1B, Node 1B' and Node 1B" have completed their processing and are thus in the done state. Node 1, Node 1' and Node 1" have their respective input edges in the complete state. In Sub-Graph 4, the states of the starting node, Node 1, Node 1' and Node 1", are set to ready, the states of other nodes are set to unready, and the states of all connecting edges are set to uncomplete. The master thread modifies the states of Node 1, Node 1' and Node 1" into run and pushes Node 1, Node 1' and Node 1" into the computing queue. The master thread returns to the step S2 and proceeds with the step S3.

Upon receiving the response, Slave Thread f sets the state of Node 4A" to done and the state of the output edge 4A"-4A of Node 4A" to complete.

Upon receiving the response, Slave Thread g sets the state of Node 3B" to done and the states of the output edges 3B"-4B" and 3B"-3 of Node 3B" to complete.

Upon receiving the response, Slave Thread h sets the state of Node 4B''' to done and the state of the output edge 4B'''-4B of Node 4B' to complete.

Step S34: Slave Thread d modifies the state of Node 4B' having its sole input edge 3B'-4B' in the complete state into ready.

Slave Thread f modifies the state of Node 4A having its sole input edge 4A"-4A in the complete state into ready.

Slave Thread g modifies the state of Node 4B" having its sole input edge 3B"-4B" in the complete state into ready.

Step S35: Slave Thread d traverses the states of the respective nodes in the directed computation graph, sets the state of Node 4B' in the ready state to run, and pushes Node 4B' into the computing queue.

Slave Thread f traverses the states of the respective nodes in the directed computation graph, sets the state of Node 4A in the ready state to run, and pushes Node 4A into the computing queue.

Slave Thread g traverses the states of the respective nodes in the directed computation graph, sets the state of Node 4B" in the ready state to run, and pushes Node 4B" into the computing queue.

Step S36: Slave Thread a takes Node 1 from the computing queue and transmits a call request of RPC to Camera 1 corresponding to Node 1. The request carries a storage address of output data, which is the storage address R1-S for Camera 1 in the shared storage space for Slave Process 1.

Slave Thread b takes Node 1' from the computing queue and transmits a call request of RPC to Camera 2 corresponding to Node 1'. The request carries a storage address of output data, which is the storage address R2-S for Camera 2 in the shared storage space for Slave Process 2.

Slave Thread c takes Node 1" from the computing queue and transmits a call request of RPC to Camera 3 corresponding to Node 1". The request carries a storage address of output data, which is the storage address R3-S for Camera 3 in the shared storage space for Slave Process 3.

Slave Thread d takes Node 4B' from the computing queue and transmits a call request of RPC to the copying module 2 corresponding to Node 4B'. The request carries a storage address of input data, which is the storage address R2-T for Vehicle Tracking 2 in the shared storage space for Slave Process 2, and a storage address of output data, which is the storage address R1-2C for the copying module 2 in the shared storage space for Slave Process 1.

Slave Thread e takes Node 4A from the computing queue and transmits a call request of RPC to Fusion 4 corresponding to Node 4A. The request carries storage addresses of input data, which are the storage address R1-T for Vehicle Tracking 1 in the shared storage space for Slave Process 1, the storage address R1-2C for the copying module 2 in the shared storage space for Slave Process 1, the storage address R1-3C for the copying module 3 in the shared storage space for Slave Process 1, and the storage address R1-4C for the copying module 4 in the shared storage space for Slave Process 1.

Slave Thread f takes Node 4B" from the computing queue and transmits a call request of RPC to the copying module 3 corresponding to Node 4B". The request carries a storage address of input data, which is the storage address R3-T for Vehicle Tracking 3 in the shared storage space for Slave Process 3, and a storage address of output data, which is the storage address R1-3C for the copying module 3 in the shared storage space for Slave Process 1.

Step S37: In response to the call request, Camera 1 writes read data T4 of a fourth frame of image into an address in the working storage space for Slave Process 1, and feeds a response back to Slave Thread a.

In response to the call request, Camera 2 writes read data T4 of a fourth frame of image into an address in the working storage space for Slave Process 2, and feeds a response back to Slave Thread b.

In response to the call request, Camera 3 writes read data T4 of a fourth frame of image into an address in the working storage space for Slave Process 3, and feeds a response back to Slave Thread c.

In response to the call request, the copying module 2 reads the input data T32' from the shared storage space for Slave Process 2, writes the output data T32' into the storage address of output data as designated in the call request, and feeds a response back to Slave Thread d.

In response to the call request, Fusion 4 reads the input data T21', T22', T23' and T25 from the shared storage space for Slave Process 1 for processing, outputs the processing result, and feeds a response back to Slave Thread e.

In response to the call request, the copying module 3 reads the input data T33' from the shared storage space for Slave Process 3 for processing, writes the output data T33' into the storage address of output data as designated in the call request, and feeds a response back to Slave Thread f.

Step S38: Upon receiving the response, Slave Thread a sets the state of Node 1 to done and the states of the output edges 1-2, 1-3 and 1-1A of Node 1 to complete.

Upon receiving the response, Slave Thread b sets the state of Node 1' to done and the states of the output edges 1'-2', 1'-3' and 1'-1A' of Node 1' to complete.

Upon receiving the response, Slave Thread c sets the state of Node 1" to done and the states of the output edges 1"-2", 1"-3", 1"-5 and 1"-1A" of Node 1" to complete.

Upon receiving the response, Slave Thread d sets the state of Node 4B' to done and the state of the output edge 4B'-4B of Node 4B' to complete.

Upon receiving the response, Slave Thread e sets the state of Node 4A to done and the state of the output edge 4A-4B of Node 4A to complete.

Further, Slave Thread e traverses Sub-Graph 2, determines that the states of all the nodes in Sub-Graph 2 are done, and releases Storage Space 2 at the head of the control queue. In this case, Storage Space 3 in which Sub-Graph 3 is stored becomes the head of the control queue and the released Storage Space 2 is now at the tail of the control queue. Slave Thread e transmits a notification to the master thread. Upon receiving the notification, the master thread performs the above steps S2 and S5-10. That is, it stores a directed computation graph, i.e., Sub-Graph 5 (not shown in FIG. 10) at the tail of the control queue and creates an output edge from a node corresponding to each serial module in Sub-Graph 4 to the corresponding node in Sub-Graph 5. The master thread initializes states of the nodes and connecting edges in the newly stored Sub-Graph 5. In particular, Node 1, Node 1' and Node 1" are in the done state. Node 1A, Node 1A' and Node 1A" have their respective input edges in the complete state. In Sub-Graph 5, the states of the starting node, Node 1A, Node 1A' and Node 1A", are set to ready, the states of other nodes are set to unready, and the states of all connecting edges are set to uncomplete. The master thread modifies the states of Node 1A, Node 1A' and Node 1A" into run and pushes Node 1A, Node 1A' and Node 1A" into the computing queue. The master thread returns to the step S2 and proceeds with the step S3.

Upon receiving the response, Slave Thread f sets the state of Node 4B" to done and the state of the output edge 4B"-4B of Node 4B" to complete.

Step S39: Slave Thread a modifies the state of Node 2 having its input edge in the complete state into ready.

Slave Thread b modifies the state of Node 2' having its input edge in the complete state into ready.

Slave Thread c modifies the states of Nodes 2" and 5 having their respective input edges in the complete state into ready.

Slave Thread f modifies the state of Node 4B having its input edge in the complete state into ready.

Step S40: Slave Thread a traverses the states of the respective nodes in the directed computation graph, sets the state of Node 2 in the ready state to run, and pushes Node 2 into the computing queue.

Slave Thread b traverses the states of the respective nodes in the directed computation graph, sets the state of Node 2' in the ready state to run, and pushes Node 2' into the computing queue.

Slave Thread c traverses the states of the respective nodes in the directed computation graph, sets the states of Node 2" and Node 5 in the ready state to run, and pushes Node 2" and Node 5 into the computing queue.

Slave Thread f traverses the states of the respective nodes in the directed computation graph, sets the state of Node 4B in the ready state to run, and pushes Node 4B into the computing queue.

Step S41: Slave Thread a takes Node 2 from the computing queue and transmits a call request of RPC to the module Vehicle Detection 1 corresponding to Node 2. The request carries a storage address of input data, which is the storage address R1-S for Camera 1 in the shared storage space for Slave Process 1, and a storage address of output data, which is the storage address R1-D for Vehicle Detection 1 in the shared storage space for Slave Process 1.

Slave Thread b takes Node 2' from the computing queue and transmits a call request of RPC to the module Vehicle Detection 2 corresponding to Node 2'. The request carries a storage address of input data, which is the storage address R2-S for Camera 2 in the shared storage space for Slave Process 2, and a storage address of output data, which is the storage address R2-D for Vehicle Detection 2 in the shared storage space for Slave Process 2.

Slave Thread c takes Node 2" from the computing queue and transmits a call request of RPC to the module Vehicle Detection 3 corresponding to Node 2". The request carries a storage address of input data, which is the storage address R3-S for Camera 3 in the shared storage space for Slave Process 3, and a storage address of output data, which is the storage address R3-D for Vehicle Detection 3 in the shared storage space for Slave Process 3.

Slave Thread d takes Node 5 from the computing queue and transmits a call request of RPC to the module Segmentation 5 corresponding to Node 5. The request carries a storage address of input data, which is the storage address R3-S for Camera 3 in the shared storage space for Slave Process 3, and a storage address of output data, which is the storage address R3-G for the module Segmentation 5 in the shared storage space for Slave Process 3.

Slave Thread e takes Node 1A from the computing queue and transmits a call request of RPC to Camera 1 corresponding to Node 1A. The request carries a storage address of output data, which is the storage address R1-S for Camera 1 in the shared storage space for Slave Process 1.

Slave Thread f takes Node 1A' from the computing queue and transmits a call request of RPC to Camera 2 corresponding to Node 1A'. The request carries a storage address of output data, which is the storage address R2-S for Camera 2 in the shared storage space for Slave Process 2.

Slave Thread g takes Node 1A" from the computing queue and transmits a call request of RPC to Camera 3 corresponding to Node 1A". The request carries a storage address of output data, which is the storage address R3-S for Camera 3 in the shared storage space for Slave Process 3.

Slave Thread h takes Node 4B from the computing queue and transmits a call request of RPC to the computing module Fusion 4 corresponding to Node 4B. The request carries storage addresses of input data, which are the storage address R1-T for Vehicle Tracking 1 in the shared storage space for Slave Process 1, the storage address R1-2C for the copying module 2 in the shared storage space for Slave Process 1, the storage address R1-3C for the copying module 3 in the shared storage space for Slave Process 1, and the storage address R1-4C for the copying module 4 in the shared storage space for Slave Process 1.

Step S42: In response to the call request, Vehicle Detection 1 reads the input data T4 from the shared storage space for Slave Process 1 for processing, writes output data T41 into the storage address of output data as designated in the call request, and feeds a response back to Slave Thread a.

In response to the call request, Vehicle Detection 2 reads the input data T4 from the shared storage space for Slave Process 2 for processing, writes output data T42 into the storage address of output data as designated in the call request, and feeds a response back to Slave Thread b.

In response to the call request, Vehicle Detection 3 reads the input data T4 from the shared storage space for Slave Process 3 for processing, writes output data T43 into the storage address of output data as designated in the call request, and feeds a response back to Slave Thread c.

In response to the call request, the module Segmentation 5 reads the input data T4 from the shared storage space for Slave Process 3 for processing, writes output data T45 into the storage address of output data as designated in the call request, and feeds a response back to Slave Thread d.

In response to the call request, Camera 1 writes read data T5 of a fifth frame of image into the storage address of output data as designated in the call request, and feeds a response back to Slave Thread e.

In response to the call request, Camera 2 writes obtained data T5 of a fifth frame of image into the storage address of output data as designated in the call request, and feeds a response back to Slave Thread f.

In response to the call request, Camera 3 writes obtained data T5 of a fourth frame of image into the storage address of output data as designated in the call request, and feeds a response back to Slave Thread g.

In response to the call request, Fusion 4 reads the input data T31', T32', T33' and T35 from the shared storage space for Slave Process 1 for processing, outputs the processing result, and feeds a response back to Slave Thread h.

Step S43: Upon receiving the response, Slave Thread a sets the state of Node 2 to done and the state of the output edge 2-3 of Node 2 to complete.

Upon receiving the response, Slave Thread b sets the state of Node 2' to done and the state of the output edge 2'-3' of Node 2' to complete.

Upon receiving the response, Slave Thread c sets the state of Node 2" to done and the state of the output edge 2"-3" of Node 2" to complete.

Upon receiving the response, Slave Thread d sets the state of Node 5 to done and the states of the output edges 5-4''' and 5-5A of Node 5 to complete.

Upon receiving the response, Slave Thread e sets the state of Node 1A to done and the states of the output edges 1A-2A, 1A-3A and 1A-1B of Node 1A to complete.

Upon receiving the response, Slave Thread f sets the state of Node 1A' to done and the states of the output edges 1A'-2A', 1A'-3A' and 1A'-1B' of Node 1A' to complete.

Upon receiving the response, Slave Thread g sets the state of Node 1A" to done and the states of the output edges 1A"-2A", 1A"-3A" and 1A"-1B" of Node 1A" to complete.

Upon receiving the response, Slave Thread h sets the state of Node 4B to done and the state of the output edge 4B-4 of Node 4B to complete.

Further, Slave Thread h traverses Sub-Graph 3, determines that the states of all the nodes in Sub-Graph 3 are done, and releases Storage Space 2 at the head of the control queue. In this case, Storage Space 3 in which Sub-Graph 3 is stored becomes the head of the control queue and the released Storage Space 2 is now at the tail of the control queue. Slave Thread h transmits a notification to the master thread. Upon receiving the notification, the master thread performs the above steps S2 and S5-10. That is, it stores a directed computation graph, i.e., Sub-Graph 6 (not shown in FIG. 10) at the tail of the control queue and creates an output edge from a node corresponding to each serial module in Sub-Graph 5 to the corresponding node in Sub-Graph 6. The master thread initializes states of the nodes and connecting edges in the newly stored Sub-Graph 6. In particular, Node 1A, Node 1A' and Node 1A" are in the done state. Node 1B, Node 1B' and Node 1B" have their respective input edges in the complete state. In Sub-Graph 3, the states of the starting node, Node 1B, Node 1B' and Node 1B", are set to ready, the states of other nodes are set to unready, and the states of all connecting edges are set to uncomplete. The master thread modifies the states of Node 1B, Node 1B' and Node 1B" into run and pushes Node 1B, Node 1B' and Node 1B" into the computing queue. The master thread returns to the step S2 and proceeds with the step S3. Then, the states of the three sub-graphs in the directed computation graph have been updated. The above processing also applies to other slave processes and details thereof will be omitted here.

It can be seen from the above processing that, the master process controls computation logics of all computing modules in a slave process in accordance with a directed computation graph. That is, the master process controls execution of the computing modules by means of RPC, and maintains states of nodes corresponding to the modules and states of outputs of the nodes based on executions of the modules. A computing module corresponding to a node can be called and executed only when the states of all input edges of the node are complete, and the state of the node and the state of each output edge of the node are updated when a response is received, such that the consistency in the input data to the computing module can be guaranteed.

Further, each slave process has a corresponding shared storage space including a storage space for each computing module in the process. Instead of transmitting data between the computing modules in accordance with the communication mechanism between processes, data is read and written using the storage space shared within the process, so as to achieve improved communication efficiency between the computing modules, reduced communication delay, improved overall communication efficiency among multiple modules and increased system throughput.

Furthermore, the master process stores directed computation graphs in a plurality of storage spaces in a control queue. Between two directed computation graphs, an output edge from a node corresponding to a serial module in a previous directed computation graph adjacent to a directed computation graph to the same node in the directed computation graph is created, such that when the serial module is to be scheduled, its execution needs to be scheduled based on the execution of the serial module in the previous directed computation graph. However, parallel modules are not subject to such constraint and can thus be executed in parallel, so as to improve processing speed.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programming skills based on the description of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for multi-module scheduling, comprising:
   reading, by a master process, a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge there between, an incoming connecting edge of a node being an input edge and an outgoing connecting edge of a node being an output edge;
   initializing, by the master process, states of the nodes and connecting edges in a current computing period, the initializing including:
      determining, by a master thread, whether there is any free storage space in a control queue based on a predetermined time interval, and if so, storing, by the master thread, one directed computation graph in one free storage space in the control queue, or otherwise setting, by the master thread, a state of the master thread to wait;
      creating, when more than one directed computation graph is stored in the control queue, an output edge from a node corresponding to each serial computing module in the directed computation graph in the $(i-1)^{th}$ storage space adjacent to a node in the directed computation graph in the $i^{th}$ storage space in accordance with a direction of the queue, where $2 \leq i < n$ and n is a number of storage spaces in the control queue and i is a natural number; and
      initializing the states of the nodes and connecting edges in the directed computation graph that is newly stored in the control queue;
   determining a node to be called based on the computation direction of the directed computation graph and the states of the nodes, the node to be called comprising a node having all of its input edges in a complete state;
   transmitting, to the computing module in the slave process corresponding to the node to be called, a call request of Remote Process Call (RPC) to execute the computing module;
   updating the state of the node and the state of each output edge of the node upon receiving a response to the call request; and
   proceeding with a next computing period after determining that the states of all the nodes in the directed computation graph have been updated;
   wherein the computing modules in each slave process comprise parallel computing modules and serial computing modules.

2. The method of claim 1, wherein the master process comprises the master thread and a thread pool comprising a plurality of slave threads,
   the state of each node comprises unready, ready, run or done, and
   the state of each connecting edge comprises uncomplete or complete.

3. The method of claim 1, wherein said initializing the states of the nodes and connecting edges in the directed computation graph that is newly stored in the control queue comprises:
   determining, by the master thread, whether the directed computation graph that is newly stored is the first directed computation graph in the control queue, and
   if so, setting a starting node of the directed computation graph to ready and the states of all the other nodes in the directed computation graph to unready; and setting all the connecting edges in the directed computation graph to uncomplete, or otherwise, for a connecting edge from a node in a previous directed computation graph adjacent to the directed computation graph to the same node in the directed computation graph, setting the state of the connecting edge to complete when the state of the node in the previous directed computation graph is done, otherwise setting the state of the connecting edge to uncomplete; setting each node in the directed computation graph having all its input edges in the complete state to ready and the states of all the other nodes to unready; and setting all the connecting edges in the directed computation graph to uncomplete.

4. The method of claim 1,
wherein said determining the node to be called based on the computation direction of the directed computation graph and the states of the nodes comprises:
traversing, by the master thread, after initializing the states of the nodes and connecting edges in the directed computation graph that is newly stored in the control queue, the states of the respective nodes in each directed computation graph in the control queue in accordance with the computation direction, determining each node in the ready state as a node to be called, the node in the ready state comprising the node having all of its input edges in the complete state, modifying the state of each node to be called into run, pushing each node to be called into a computing queue and entering the wait state; or
traversing, by one slave thread in the thread pool in computation, the states of the respective nodes in each directed computation graph in the control queue in accordance with the computation direction, determining each node in the ready state as a node to be called, the node in the ready state comprising the node having all of its input edges in the complete state, modifying the state of each node to be called into run, and pushing each node to be called into a computing queue.

5. The method of claim 4, wherein said transmitting, to the computing module in the slave process corresponding to the node to be called, the call request of RPC to execute the computing module comprises:
taking, by one slave thread in the thread pool, one node from the computing queue and transmitting the call request of RPC to the computing module in the slave process corresponding to the one node.

6. The method of claim 5, further comprising:
determining, by one slave thread in the thread pool, an identifier of the computing module corresponding to the one node taken from the computing queue and a storage address of input data to the computing module and/or a storage address of output data from the computing module in accordance with the pre-stored configuration file, and including the identifier of the computing module, the storage address of the input data and/or the storage address of the output data in the call request.

7. The method of claim 6, wherein the storage address of the output data from the computing module is an address corresponding to the computing module in a shared storage space corresponding to the slave process in which the computing module is comprised, or the storage address of the output data is an address corresponding to the computing module in a shared storage space corresponding to another slave process, and
the storage address of the input data to the computing module is an address in the shared storage space corresponding to the slave process in which the computing module is comprised.

8. The method of claim 2, wherein said updating the state of the node and the state of each output edge of the node upon receiving the response to the call request comprises:
setting, by one slave thread in the thread pool upon receiving the response to the call request transmitted for one node, the state of the node to done, modifying the state of each output edge of the node into complete, and setting the state of each node having all its input edges in the complete state to ready.

9. The method of claim 1, wherein said proceeding with the next computing period after determining that the states of all the nodes in the directed computation graph have been updated comprises:
traversing, by one slave thread in the thread pool, the states of the respective nodes in the directed computation graph at a head of the control queue, and when determining that the states of all the nodes in the directed computation graph are done, releasing a storage space at the head of the control queue and notifying the master thread in the wait state to proceed with the next computing period.

10. A method for multi-module scheduling, comprising:
reading, by a master process, a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge there between, an incoming connecting edge of a node being an input edge and an outgoing connecting edge of a node being an output edge;
wherein the computing modules in each slave process comprise parallel computing modules and serial computing modules, and
the master process initializing the states of the nodes and connecting edges comprises:
determining, by a master thread, whether there is any free storage space in a control queue based on a predetermined time interval, and if so, storing, by the master thread, one directed computation graph in one free storage space in the control queue, or otherwise setting, by the master thread, a state of the master thread to wait;
creating, when more than one directed computation graph is stored in the control queue, an output edge from a node corresponding to each serial computing module in the directed computation graph in the $(i-1)^{th}$ storage space adjacent to a node in the directed computation graph in the $i^{th}$ storage space in accordance with a direction of the queue, where $2 \le i < n$ and n is a number of storage spaces in the control queue and i is a natural number; and
initializing the states of the nodes and connecting edges in the directed computation graph that is newly stored in the control queue, and
initializing, by the master process, states of the nodes and connecting edges in a current computing period;
receiving, by a computing module in a slave process in a current computing period, a call request of Remote Process Call (RPC) from a master process, wherein the slave process comprises a plurality of computing modules grouped in accordance with a computation direction, and wherein for the computing module having a plurality of pieces of input data, the call request is transmitted by the master process when determining that all of the plurality of pieces of input data to the computing module are ready;

performing, by the computing module, processing in response to the call request; and feeding, by the computing module, a response back to the master process when the processing has completed.

11. The method of claim 10, wherein the received call request includes an identifier of the computer module, a storage address of input data to the computing module and/or a storage address of output data from the computing module, and said the computing module performing processing in response to the call request comprises:

reading, by the computing module in response to the call request, the input data from the storage address of the input data for processing, and writing the output data into the storage address of the output data.

12. The method of claim 11, wherein the storage address of the output data is an address corresponding to the computing module in a shared storage space corresponding to the slave process, or the storage address of the output data is an address corresponding to the computing module in a shared storage space corresponding to another slave process.

13. The method of claim 11, wherein the storage address of the input data is an address in a shared storage space corresponding to the slave process.

14. The method of claim 10, wherein the computing module is a service function.

15. An apparatus for multi-module scheduling, comprising a processor and at least one memory storing at least one machine executable instruction, the processor being operative to execute the at least one machine executable instruction to:

read a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge there between, an incoming connecting edge of a node being an input edge and an outgoing connecting edge of a node being an output edge;

initialize, by a master process, states of the nodes and connecting edges in a current computing period, the processor being operative to execute the at least one machine executable instruction to initialize, by the master process, the states of the nodes and connecting edges comprises a master thread being configured to:

determine whether there is any free storage space in a control queue based on a predetermined time interval, and if so, store one directed computation graph in one free storage space in the control queue, or otherwise set a state of the master thread to wait;

create, when more than one directed computation graph is stored in the control queue, an output edge from a node corresponding to each serial computing module in the directed computation graph in the $(i-1)^{th}$ storage space to an adjacent node in the directed computation graph in the $i^{th}$ storage space in accordance with a direction of the queue, where $2 \leq i \leq n$ and n is a number of storage spaces in the control queue and is a natural number; and initialize the states of the nodes and connecting edges in the directed computation graph that is newly stored in the control queue;

determine a node to be called based on the computation direction of the directed computation graph and the states of the nodes, the node to be called comprising a node having all of its input edges in a complete state;

transmit, to the computing module in the slave process corresponding to the node to be called, a call request of Remote Process Call (RPC) to execute the computing module;

update the state of the node and the state of each output edge of the node upon receiving a response to the call request; and proceed with a next computing period after determining that the states of all the nodes in the directed computation graph have been updated;

wherein the computing modules in each slave process comprise parallel computing modules and serial computing modules.

16. The apparatus of claim 15, wherein the processor is operative to execute the at least one machine executable instruction to provide a master thread and a thread pool comprising a plurality of slave threads, the state of each node comprises unready, ready, run or done, and the state of each connecting edge comprises uncomplete or complete.

17. The apparatus of claim 15, wherein the processor being operative to execute the at least one machine executable instruction to initialize the states of the nodes and connecting edges in the directed computation graph that is newly stored in the control queue comprises the master thread being configured to:

determine whether the directed computation graph that is newly stored is the first directed computation graph in the control queue, and if so, set a starting node of the directed computation graph to ready and the states of all the other nodes in the directed computation graph to unready, and set all the connecting edges in the directed computation graph to uncomplete, otherwise, for a connecting edge from a node in a previous directed computation graph adjacent to the directed computation graph to the same node in the directed computation graph, set the state of the connecting edge to complete when the state of the node in the previous directed computation graph is done, or otherwise set the state of the connecting edge to uncomplete; set each node in the directed computation graph having all its input edges in the complete state to ready and the states of all the other nodes to unready; and set all the connecting edges in the directed computation graph to uncomplete.

18. The apparatus of claim 16, wherein the processor being operative to execute the at least one machine executable instruction to determine the node to be called based on the computation direction of the directed computation graph and the states of the nodes comprises:

the master thread being configured to traverse, after initializing the states of the nodes and connecting edges in the directed computation graph that is newly stored in the control queue, the states of the respective nodes in each directed computation graph in the control queue in accordance with the computation direction, determine each node in the ready state as a node to be called, the node in the ready state comprising the node having all of its input edges in the complete state, modify the state of each node to be called into run, push each node to be called into a computing queue and enter the wait state; or one slave thread in the thread pool being configured to traverse, in computation, the states of the respective nodes in each directed computation graph in the control queue in accordance with the computation direction, determine each node in the ready state as a node to be called, the node in the ready state comprising the node having all of its input edges in the complete state, modify the state of each node to be called into run, and push each node to be called into a computing queue.

19. The apparatus of claim 18, wherein the processor being operative to execute the at least one machine executable instruction to transmit, to the computing module in the slave process corresponding to the node to be called, the call request of RPC to execute the computing module comprises one slave thread in the thread pool being configured to:

take one node from the computing queue and transmit the call request of RPC to the computing module in the slave process corresponding to the one node.

20. The apparatus of claim 19, wherein the processor is further operative to execute the at least one machine executable instruction to:

determine an identifier of the computing module corresponding to the one node taken from the computing queue and a storage address of input data to the computing module and/or a storage address of output data from the computing module in accordance with the pre-stored configuration file, and include the identifier of the computing module, the storage address of the input data and/or the storage address of the output data in the call request, wherein the storage address of the output data from the computing module is an address corresponding to the computing module in a shared storage space corresponding to the slave process in which the computing module is comprised, or the storage address of the output data is an address corresponding to the computing module in a shared storage space corresponding to another slave process, and the storage address of the input data to the computing module is an address in the shared storage space corresponding to the slave process in which the computing module is comprised.

21. The apparatus of claim 16, wherein the processor being operative to execute the at least one machine executable instruction to update the state of the node and the state of each output edge of the node upon receiving the response to the call request comprises one slave thread in the thread pool being configured to:

set, upon receiving the response to the call request transmitted for one node, the state of the node to done, modify the state of each output edge of the node into complete, and set the state of each node having all its input edges in the complete state to ready.

22. The apparatus of claim 16, wherein the processor being operative to execute the at least one machine executable instruction to proceed with the next computing period after determining that the states of all the nodes in the directed computation graph have been updated comprises one slave thread in the thread pool being configured to:

traverse the states of the respective nodes in the directed computation graph at a head of the control queue, and when determining that the states of all the nodes in the directed computation graph are done, release a storage space at the head of the control queue and notify the master thread in the wait state to proceed with the next computing period.

23. An apparatus for multi-module scheduling, comprising a processor and at least one memory storing at least one machine executable instruction, the processor being operative to execute the at least one machine executable instruction to:

read, by a master process, a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge there between, an incoming connecting edge of a node being an input edge and an outgoing connecting edge of a node being an output edge;

wherein the computing modules in each slave process comprise parallel computing modules and serial computing modules, and initialize, by the master process, the states of the nodes and connecting edges comprises:

determining, by a master thread, whether there is any free storage space in a control queue based on a predetermined time interval, and if so, storing, by the master thread, one directed computation graph in one free storage space in the control queue, or otherwise setting, by the master thread, a state of the master thread to wait;

create, by the master process, when more than one directed computation graph is stored in the control queue, an output edge from a node corresponding to each serial computing module in the directed computation graph in the $(i-1)^{th}$ storage space adjacent to a node in the directed computation graph in the $i^{th}$ storage space in accordance with a direction of the queue, where $2 \leq i < n$ and n is a number of storage spaces in the control queue and i is a natural number; and initialize, by the master process, the states of the nodes and connecting edges in the directed computation graph that is newly stored in the control queue;

initialize, by the master process, states of the nodes and connecting edges in a current computing period;

receive, in a current computing period, a call request of Remote Process Call (RPC) from a master process, wherein for the apparatus for multi-module scheduling having a plurality of pieces of input data, the call request is transmitted by the master process when determining that all of the plurality of pieces of input data to the apparatus for multi-module scheduling are ready;

perform processing in response to the call request; and feed a response back to the master process when the processing has completed.

24. The apparatus of claim 23, wherein the processor is further operative to execute the at least one machine executable instruction such that the received call request includes an identifier of the computer module, a storage address of input data to the computing module and/or a storage address of output data from the computing module, the storage address of the output data being an address corresponding to the computing module in a shared storage space corresponding to the slave process or being an address corresponding to the computing module in a shared storage space corresponding to another slave process, and the storage address of the input data being an address in the shared storage space corresponding to the slave process, and the processor being operative to execute the at least one machine executable instruction to perform processing in response to the call request comprises the processor being operative to execute the at least one machine executable instruction to:

read, in response to the call request, the input data from the storage address of the input data for processing, and write the output data into the storage address of the output data.

25. A system for multi-module scheduling comprising a processor and a memory configured to:

read, by a master process, a pre-stored configuration file storing a directed computation graph associated with a computing task, the computing task comprising a plurality of slave processes each comprising a plurality of computing modules grouped in accordance with a computation direction, the directed computation graph comprising a plurality of nodes each corresponding to one computing module in one slave process, at least two of the nodes having a connecting edge there between, an incoming connecting edge of a node being an input edge and an outgoing connecting edge of a node being an output edge;

initialize, by the master process, states of the nodes and connecting edges in a current computing period, the initializing the states of the nodes and connecting edges comprising:

determining, by a master thread, whether there is any free storage space in a control queue based on a predetermined time interval, and if so, storing, by the master thread, one directed computation graph in one free storage space in the control queue, or otherwise setting, by the master thread, a state of the master thread to wait, creating, when more than one directed computation graph is stored in the control queue, an output edge from a node corresponding to each serial computing module in the directed computation graph in the $(i-1)^{th}$ storage space adjacent to a node in the directed computation graph in the $i^{th}$ storage space in accordance with a direction of the queue, where $2 \leq i < n$ and n is a number of storage spaces in the control queue and i is a natural number, and initializing the states of the nodes and connecting edges in the directed computation graph that is newly stored in the control queue;

determine a node to be called based on the computation direction of the directed computation graph and the states of the nodes, the node to be called comprising a node having all of its input edges in a complete state;

transmit, to the computing module in the slave process corresponding to the node to be called, a call request of Remote Process Call (RPC) to execute the computing module;

update the state of the node and the state of each output edge of the node upon receiving a response to the call request; and proceed with a next computing period after determining that the states of all the nodes in the directed computation graph have been updated, and one computing module in the slave process is configured to receive the call request of RPC from the master process, perform processing in response to the call request; and feed a response back to the master process when the processing has completed;

wherein the computing modules in each slave process comprise parallel computing modules and serial computing modules.

\* \* \* \* \*

UNITED STATES PATENT AND TRADEMARK OFFICE
CERTIFICATE OF CORRECTION

PATENT NO. : 10,942,771 B2
APPLICATION NO. : 16/275984
DATED : March 9, 2021
INVENTOR(S) : Yifan Gong et al.

Page 1 of 1

It is certified that error appears in the above-identified patent and that said Letters Patent is hereby corrected as shown below:

In the Specification

In Column 21, Line 60, delete "a copying module 4'" and insert -- a copying module 4''' --, therefor.

In the Claims

In Column 42, Lines 1-2, in Claim 1, delete "there between," and insert -- therebetween, --, therefor.

In Column 44, Lines 31-32, in Claim 10, delete "there between," and insert -- therebetween, --, therefor.

In Column 45, Line 44, in Claim 15, delete "there between," and insert -- therebetween, --, therefor.

In Column 45, Line 65, in Claim 15, delete "$2 \leq i \leq n$" and insert -- $2 \leq i < n$ --, therefor.

In Column 45, Line 67, in Claim 15, delete "and is" and insert -- and i is --, therefor.

In Column 46, Line 40, in Claim 17, delete "unready," and insert -- unready; --, therefor.

In Column 48, Lines 17-18, in Claim 23, delete "there between," and insert -- therebetween, --, therefor.

In Column 48, Line 26, in Claim 23, delete "determining," and insert -- determine, --, therefor.

In Column 49, Line 14, in Claim 25, delete "scheduling" and insert -- scheduling, --, therefor.

In Column 49, Lines 24-25, in Claim 25, delete "there between," and insert -- therebetween, --, therefor.

In Column 50, Line 25, in Claim 25, delete "request; and" and insert -- request; --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*